United States Patent
Atsuta et al.

(10) Patent No.: US 6,975,211 B2
(45) Date of Patent: Dec. 13, 2005

(54) CONTROL APPARATUS AND CONTROL METHOD FOR MANAGING COMMUNICATIONS BETWEEN MULTIPLE ELECTRICAL APPLIANCES THROUGH A HOUSEHOLD POWER LINE NETWORK

(75) Inventors: Akira Atsuta, Berkshire (GB); Masaharu Uchiyama, Tochigi (JP)

(73) Assignee: Panasonic Communications Co., Ltd., Tokyo (JP)

(*) Notice: Subject to any disclaimer, the term of this patent is extended or adjusted under 35 U.S.C. 154(b) by 114 days.

(21) Appl. No.: 10/682,973

(22) Filed: Oct. 14, 2003

(65) Prior Publication Data
US 2004/0122531 A1    Jun. 24, 2004

(30) Foreign Application Priority Data
Dec. 19, 2002 (JP) .............................. 2002-367803

(51) Int. Cl.[7] .............................................. H04M 11/04
(52) U.S. Cl. ............................ 340/310.06; 340/310.02
(58) Field of Search ................ 340/310.01–310.08, 340/870.18, 505, 286.02; 332/184–185; 700/1, 700/9, 10; 375/258, 259

(56) References Cited
U.S. PATENT DOCUMENTS

| | | | |
|---|---|---|---|
| 4,429,299 A * | 1/1984 | Kabat et al. ........... | 340/310.06 |
| 4,580,276 A * | 4/1986 | Andruzzi et al. ........... | 375/269 |
| 5,084,903 A * | 1/1992 | McNamara et al. ........ | 375/290 |
| 5,410,292 A * | 4/1995 | Le Van Suu ........... | 340/310.06 |
| 6,349,111 B1 * | 2/2002 | Huloux ....................... | 375/222 |
| 6,405,261 B1 * | 6/2002 | Gaucher ..................... | 709/250 |
| 6,854,059 B2 * | 2/2005 | Gardner ..................... | 713/171 |
| 2004/0024913 A1 * | 2/2004 | Ikeda et al. ................ | 709/249 |

FOREIGN PATENT DOCUMENTS

JP    2002-084658    3/2002

OTHER PUBLICATIONS

English Language Abstract of JP 2002-084658.

* cited by examiner

Primary Examiner—Jeffery Hofsass
Assistant Examiner—Eric Blount
(74) Attorney, Agent, or Firm—Greenblum & Bernstein, P.L.C.

(57) ABSTRACT

The present invention relates to a control apparatus for managing communications between a plurality of electric appliances connected to a household power line network. The apparatus transmits a plurality of types of modulation method control signals to each of the plurality of electric appliances, each type of control signal utilizing a different modulation method. When receiving a response from each electric appliance, the apparatus detects to which type of modulation method control signal the response was made and judges the type of the modulation method that is utilized in each electric appliance based on the detection.

16 Claims, 20 Drawing Sheets

| appliance | modulation method | | | data transmission speed | address | other data |
|---|---|---|---|---|---|---|
| | FSK | ASK | PSK | | | |
| air conditioner (105) | | | O | 5400bps | 0X0105 | ECHONET compatible |
| TV (107) | O | | | 2400bps | 0X0107 | |
| TV (108) | O | | | 2400bps | 0X0108 | ECHONET compatible |
| washing machine (109) | O | O | | FSK:2400bps ASK:1200bps | 0X0109 | |
| microwave (110) | O | | O | FSK:2400bps PSK:5400bps | 0X0110 | |
| refrigerator (111) | | O | | 1200bps | 0X0111 | |
| — | | | | | | |

301　302　303　304　305

CONTROL APPARATUS AND CONTROL METHOD FOR MANAGING COMMUNICATIONS BETWEEN MULTIPLE ELECTRICAL APPLIANCES THROUGH A HOUSEHOLD POWER LINE NETWORK

BACKGROUND OF THE INVENTION

1. Field of the Invention

The invention relates to an apparatus and method for controlling communications between electrical appliances through household power lines.

2. Description of the Related Art

A control system is currently available that controls the operation of household electrical appliances by communicating with those appliances through the electric wires that supply electrical power to the lights and appliances in the home. This control system is called a household power line communication system. That is a control system in which the wires supplying power to the lights and electrical appliances in the home are also used as a communications medium. In this system, each electrical appliance in the home is equipped with a power line communications modem. A centralized control unit is also provided to control communications with and between electrical appliances. For example, the control unit may be able to monitor a condition in which a refrigerator door has been open longer than a specified time duration, and direct a television receiver to display an on-screen warning. Furthermore, Japanese Patent Publication No.2002-84658 shows the system that may be able to control the consumption of electricity by the household electrical appliances in order to keep consumption below an amount contracted with the electric power utility.

However, the household power line communication system has the following problems.

There are no international standards in regard to the use of household power lines for communication purposes. Different countries and even different regions within a country may often use different standards. The reasons for that are because they have their own the frequency bandwidth that can be allocated for power line communications, their own voltage used by electrical appliances, and their own frequency bandwidths already being used for other purposes, such as radio broadcasts. Therefore, establishing an international standard has proven difficult.

In Japan, a domestic operating standard for power line communications has been established through the work of the Echo-net Consortium. However in Europe, while a frequency bandwidth has been established for household power line communications (European Norm 50065-1), a modem modulation method has not been decided for such communication. Moreover, an access protocol (the Carrier Sense Multiple-Access (CSMA)) that is established for avoiding the cross interference of various methods of modulation, such as the cross interference with radio broadcasts, specifies that the frequency bandwidth called the "C" band of 125 to 140 kHz in European Norm 50065-1 should be utilized for power line communications. If one adheres to CSMA, it becomes possible to build a system compatible with various methods of modulation.

Examples of these modulation methods are Amplitude Shift Keying (ASK), Frequency Shift Keying (FSK), and Phase Shift Keying (PSK), each having its own advantages and disadvantages.

These modulation methods generally exhibit the following characteristics. The ASK method, while offering the advantage of simple circuit structure, is susceptible to noise interference. The PSK method offers desirable noise resistance characteristics, but requires a complex circuit structure. The FSK method offers characteristics lying between those of the ASK and PSK methods.

As a result of these factors, no standardized method of modulation has been established for power line communications in Europe. Even if one purchases a European electrical appliance with power line communications capability, there is still the problem of a lack of compatibility between electrical appliances because of their use of different modulation methods.

This present invention is provided to solve above problem. The purpose of the invention is to provide a control apparatus and method that can manage all electric appliances in the home through household power line communications, that can be used in Europe where there is no modulation method standard for power line communications systems, and that can manage multiple electrical appliances equipped with modems that may not operate with a common modulation method.

SUMMARY OF THE INVENTION

A control apparatus and control method of this invention controls communications between multiple electrical appliances connected to a household power line network, even when a plurality of types of modulation systems are utilized for power line communications as in Europe. In order to determine which type of modulation method is utilized in each electric appliance, a control apparatus outputs a plurality of types of modulation method control signals to each of the plurality of electrical appliances through a household power line. Each electrical appliance replies to the modulation method control signal corresponding to the modulation method that is utilized. Therein, the control apparatus detects a response output by each electric appliance. The control apparatus judges the type of the modulation method utilized in each electric appliance based on the detection of the response.

Additionally, a control apparatus and control method of this invention receives modulation method control signals from multiple electric appliances and detects the shift points of the carrier wave of said modulation method control signals. The invention judges, based on the interval of the shift points, which type of modulation method is utilized in each electric appliance and stores the type of modulation method utilized in each electric appliance.

Furthermore, a control apparatus and control method of this invention has a memory that stores information regarding which type of modulation method is utilized in each electric appliance. The control apparatus receives a modulation method control signal from a first electric appliance, and the modulation method control signal from the first appliance should be transmitted to a second electric appliance. The control apparatus also compares the type of modulation method of the first electric appliance with that of the second electric appliance and converts the type of the modulation method control signal of the first electric appliance into the type of the modulation method control signal of the second electric appliance when the type of modulation method utilized in the first electric appliance is different from that of the second electric appliance. The control apparatus transmits the converted modulation method control signal to the second electric appliance.

DESCRIPTION OF THE DRAWINGS

The above and other object and features of the invention will appear more fully hereinafter from a consideration of the following description taken in connection with the accompanying drawings wherein one embodiment of the present invention is illustrated by way of example, and in which;

FIG. 3 illustrates an example of the appliance data table stored in the memory of the control unit as described according to the embodiment of the invention;

DETAILED DESCRIPTION OF THE PREFERENCE EMBODIMENTS

The following will provide a detailed description of an embodiment of the present invention with reference to the drawings.

Figure 1:
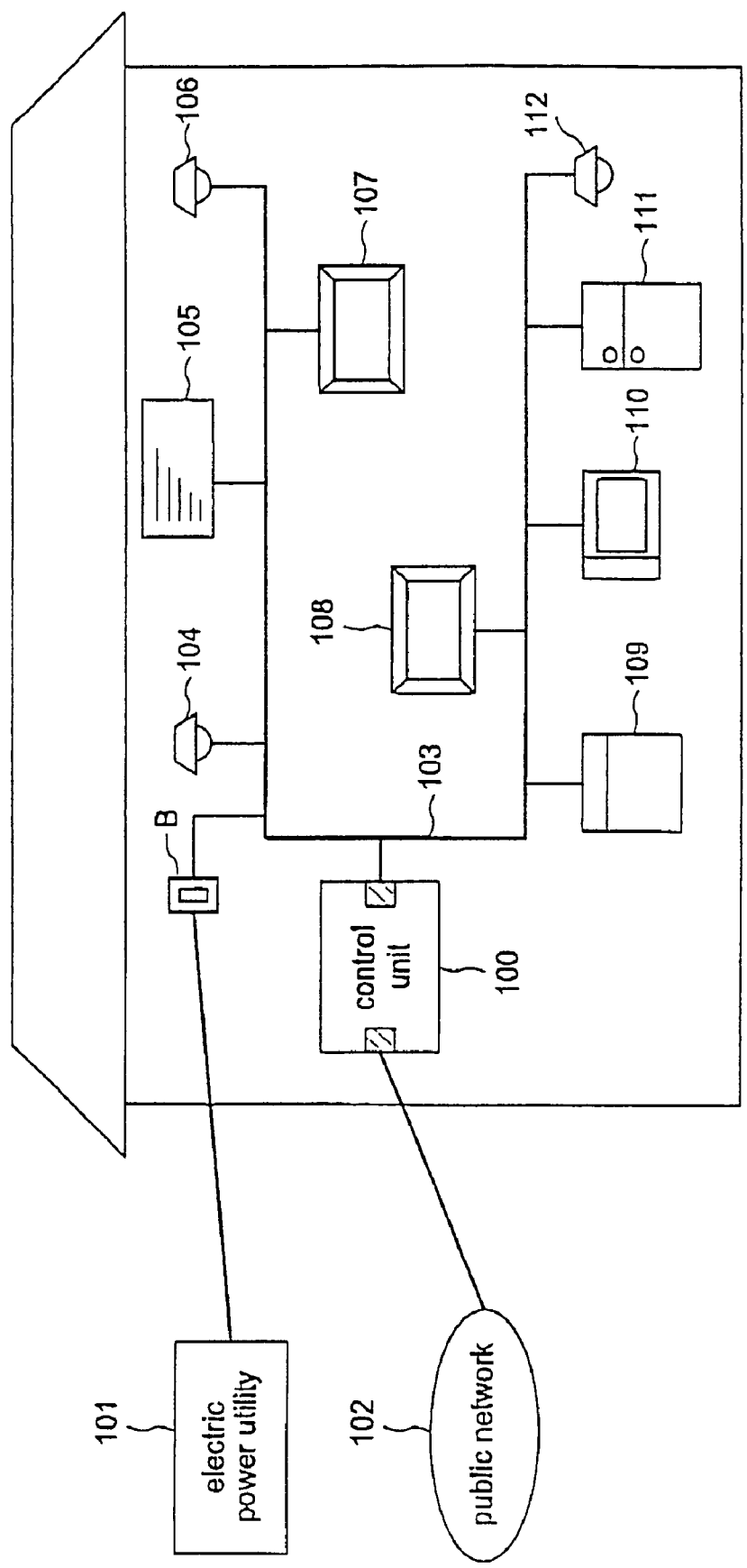
FIG. 1 illustrates, by a schematic drawing, the household appliance network to which the control unit, as described by the exemplary embodiment of the invention, can be applied.

FIG. 1 illustrates the structure of a household network to which control unit 100 is connected.

As illustrated in FIG. 1, control unit 100 is connected to the electrical appliances in the household power line network. Control unit 100 is also connected to public network 102 (such as for example a PSTN, xDSL, WLL, cable network etc.) through a data communication line, and is the component through which public network 102 connects to the household power lines.

Control unit 100 is connected to each electrical appliance in the home through household power line 103. Power line 103 receives electrical power from the electric power utility through circuit breaker "B", carries electrical power to each appliance, and also serves as the medium through which various communication and/or control signals travel between control unit 100 and interior lighting fixtures 104, 106 and 112, air conditioner 105, televisions 107 and 108, washing machine 109, microwave oven 110, and refrigerator 111. Of course, these appliance identifications are merely exemplary. Any types of such appliances are included in the present invention. Furthermore, all types of electrical tools and other electrical devices are also within the scope of the present invention. In other words, household power line 103 (hereafter referred to as power line 103) forms an in-house communications network through which control unit 100 is able to execute a centralized control function for each electric appliance.

Control unit 100 and each electrical appliance (hereafter referred to as "appliance") are able to superimpose signals on the voltage of power line 103. That is, a Power Line Communication (PLC) unit is able to transmit a signal by combining the signal with a carrier wave on power line 103 to which electrical power is being supplied, and is able to receive the signal by extracting it from the voltage on power line 103. The PLC unit thus makes it possible to use power line 103 as a communications line that can be used by both control unit 100 and the appliances. An appropriate PLC unit is provided to each controlled appliance as well as to the control unit 100.

When power line 103 used as a communications line, the PLC unit, which is installed to each appliance, is able to provide a modem communications function based on the specific modulation method used by the appliance. The PLC unit in the control unit is able to provide a modem communications function through multiple modulation methods in order to communicate with an appliance through the specific modulation method used by that appliance. The multiple modulation method PLC unit installed to control unit 100 is called a multi-PLC unit in contrast to the single modulation method PLC unit installed to each appliance.

Figure 2:
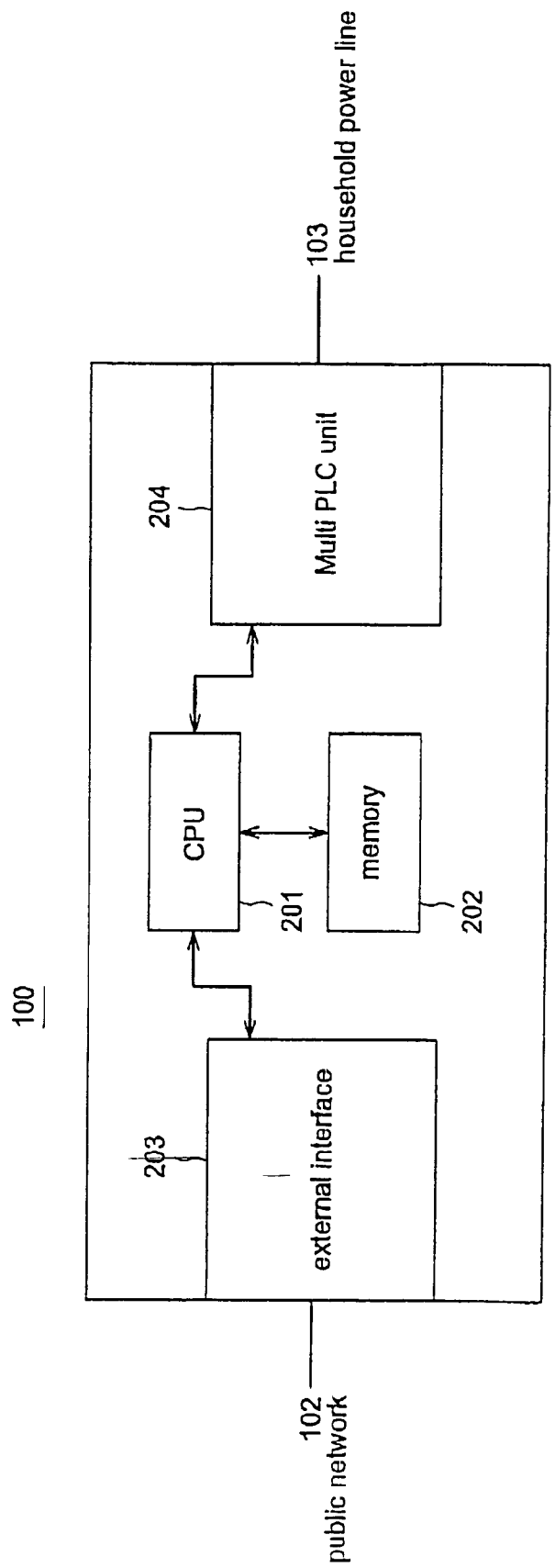
FIG. 2 illustrates, by a schematic drawing, the basic structure of the control unit as described according to the embodiment of the invention.

FIG. 2 is a block diagram showing the basic structure of control unit 100 used in the description of the embodiment.

As shown in the figure, control unit 100 includes CPU 201, memory 202 that stores the programs used by CPU 201 to control all the appliances, external interface 203 that connects the control unit to a public network through a communications circuit, and the previously described multi-PLC unit 204.

Furthermore, memory 202 stores a data table (hereafter called an appliance data table) that is referenced when multi-PLC unit 204 communicates with an appliance.

FIG. 3 provides an example of the appliance data table stored in memory 202 of control unit 100 as embodied in the present invention. This appliance data table contains appliance data that has been previously stored in the table.

Appliance data table 300 contains data indicating the type of modulation method 302, the data transmission speed 303, the address 304, and, other data, such as the modulation method 305 for the PLC unit installed to each appliance 301 connected to power line 103. Using the data of this appliance data table as an example, we can see that the PLC unit installed to air conditioner 105 uses the PSK modulation method and that the data transmission speed is 5,400 bps. Data has also been registered in the table showing that air conditioner 105 can be addressed at 0X0105, and that it is compatible with the Echonet protocol.

Figure 4:
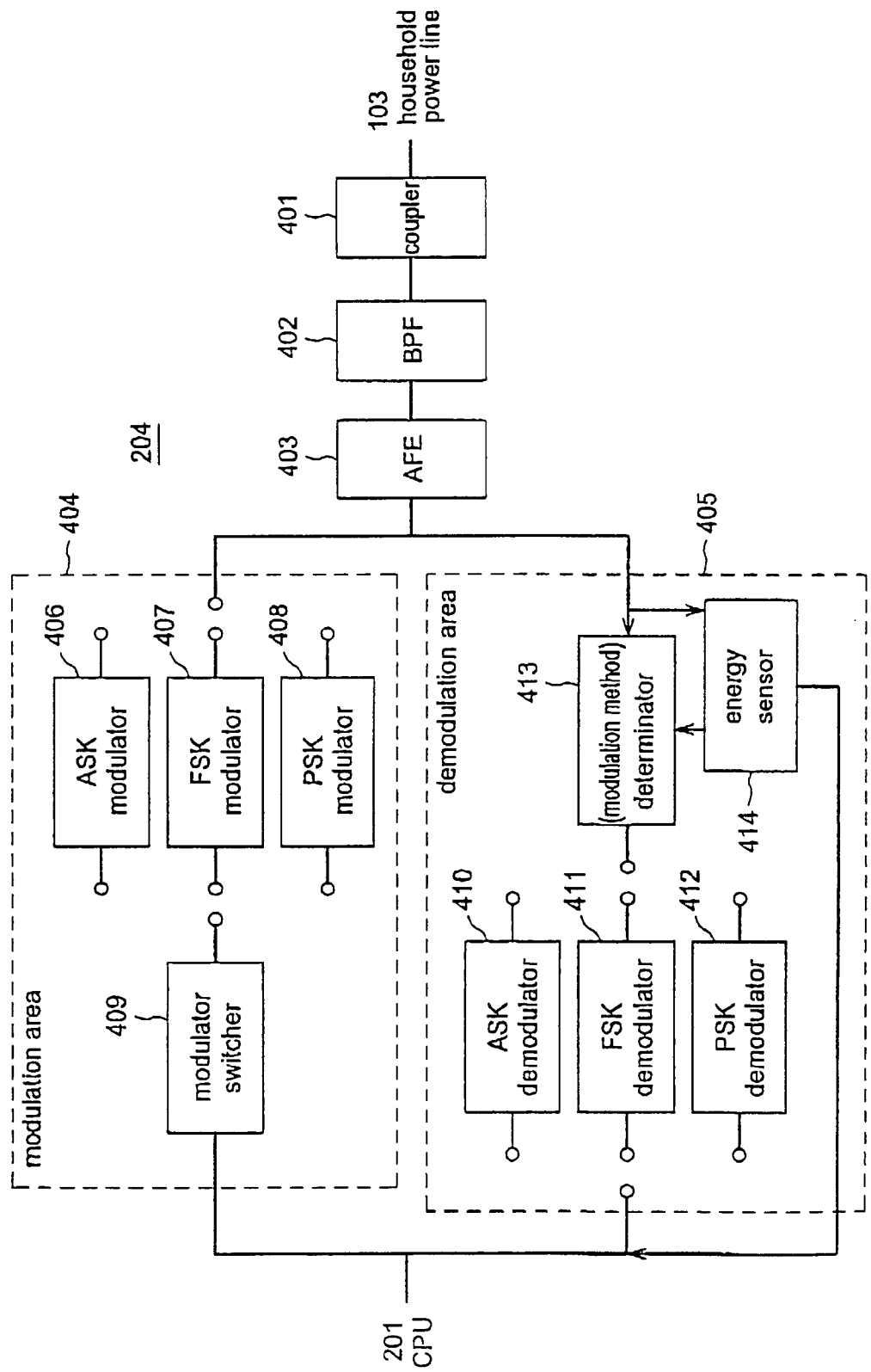
FIG. 4 illustrates, by a schematic-drawing, the structure of the multi-PCL unit installed within the control unit, as described according to the embodiment of the invention.

FIG. 4 is a block diagram illustrating the structure of multi-PLC unit 204 in control unit 100.

Coupler 401, which is contained in multi-PLC unit 204, extracts only a signal within the bandwidth used for power line communications. Band pass filter 402 allows passage only of power line communications signals by filtering out electrical noise from motors and other electrical devices. Analog Front End (AFE) 403 performs an analog-digital switching function for the signals extracted by the band pass filter.

Modulator 404 selects the modulation method instructed by CPU 201, and applies a modulation processing operation to the signals output by each appliance. Demodulator 405 determines the demodulation method of signals received from each appliance, and applies a demodulation processing operation to those signals.

Modulator 404 contains AKS modulator 406, FSK modulator 407, PSK modulator 408, and modulation switcher 409 that respectively conduct ASK, FSK, and PSK modulation processing for signals transmitted by the appliances. Furthermore, modulators 406, 407, and 408 are structured to be compatible with multiple modulation speeds (data transmission speeds). Modulation switcher 409 performs a selection operation between ASK modulator 406, FSK modulator 407, and PSK modulator 408 based on transmission signal addresses specified by CPU 201.

Demodulator 405 contains ASK demodulator 410, FSK demodulator 411, PSK demodulator 412, received signal modem determinator 413 (hereafter referred to as determinator 413), and energy sensor 414. ASK demodulator 410, FSK demodulator 411, and PSK demodulator 412 respectively apply ASK, FSK, and PSK demodulation processing methods to signals received from the appliance. Furthermore, demodulators 411, 412, and 413 are structured to be compatible with multiple demodulation speeds (data transmission speeds).

Determinator 413 ascertains the modulation method for received signals, and selects the appropriate demodulator from among ASK demodulator 410, FSK demodulator 411, and PSK demodulator 412. Energy sensor 414 detects a signal that has an energy value above a specific energy for a predetermined frequency bandwidth, and notifies determinator 413 and CPU 201 of that signal. On receiving this data, determinator 413 initiates the processing operation through which a modulation method is determined for the received signal. CPU 201, upon being notified of the received signal, stops the output of the transmission signal to the appliance. The process through which determinator 413 ascertains the modulation method for the received signal will be explained subsequently.

Figure 5:
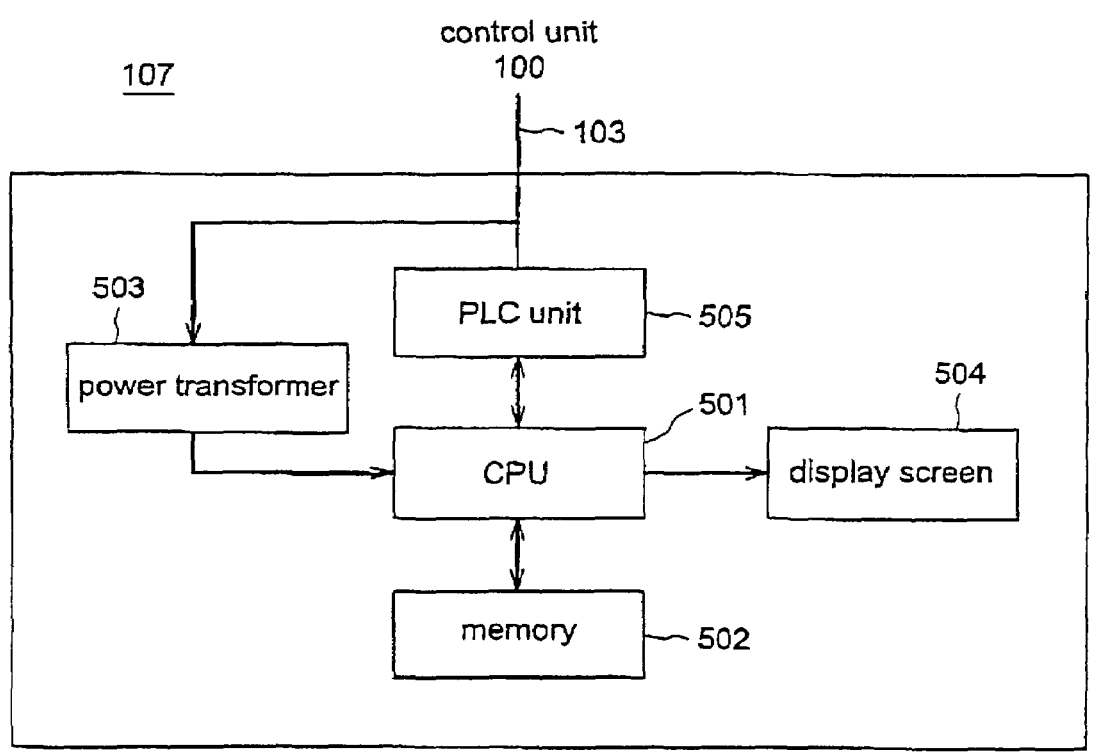
FIG. 5 illustrates a schematic drawing illustrating, as described by the embodiment, the structure of an appliance connected to the control unit through a household power line.

FIG. 5 is a block diagram illustrating the basic structure of an electrical appliance connected to control unit 100 through power line 103. For explanatory purposes, the following explanation will refer to the appliance in FIG. 5 as television 107.

Television 107 includes a CPU 501 that controls all television operations, memory 502 that stores television control programs run by CPU 501 and the address of control unit 100 required for power line communications. A power transformer 503 transforms incoming power from power line 103 into power that can be used by the internal microcomputer, screen 504 displays the televised image, and PLC unit 505 that provides the modem function for power line communications.

Although the embodiment will be explained for an appliance in which only the address of control unit 100 is stored in memory 502, memory 502 may also stored the addresses of other appliances that are connected to household power line 103 and that use the same modulation method as that of television 107. If this is the case, CPU 501 may execute a power line communication control function with the other appliances that use the same modulation method without going through control unit 100.

Figure 6:
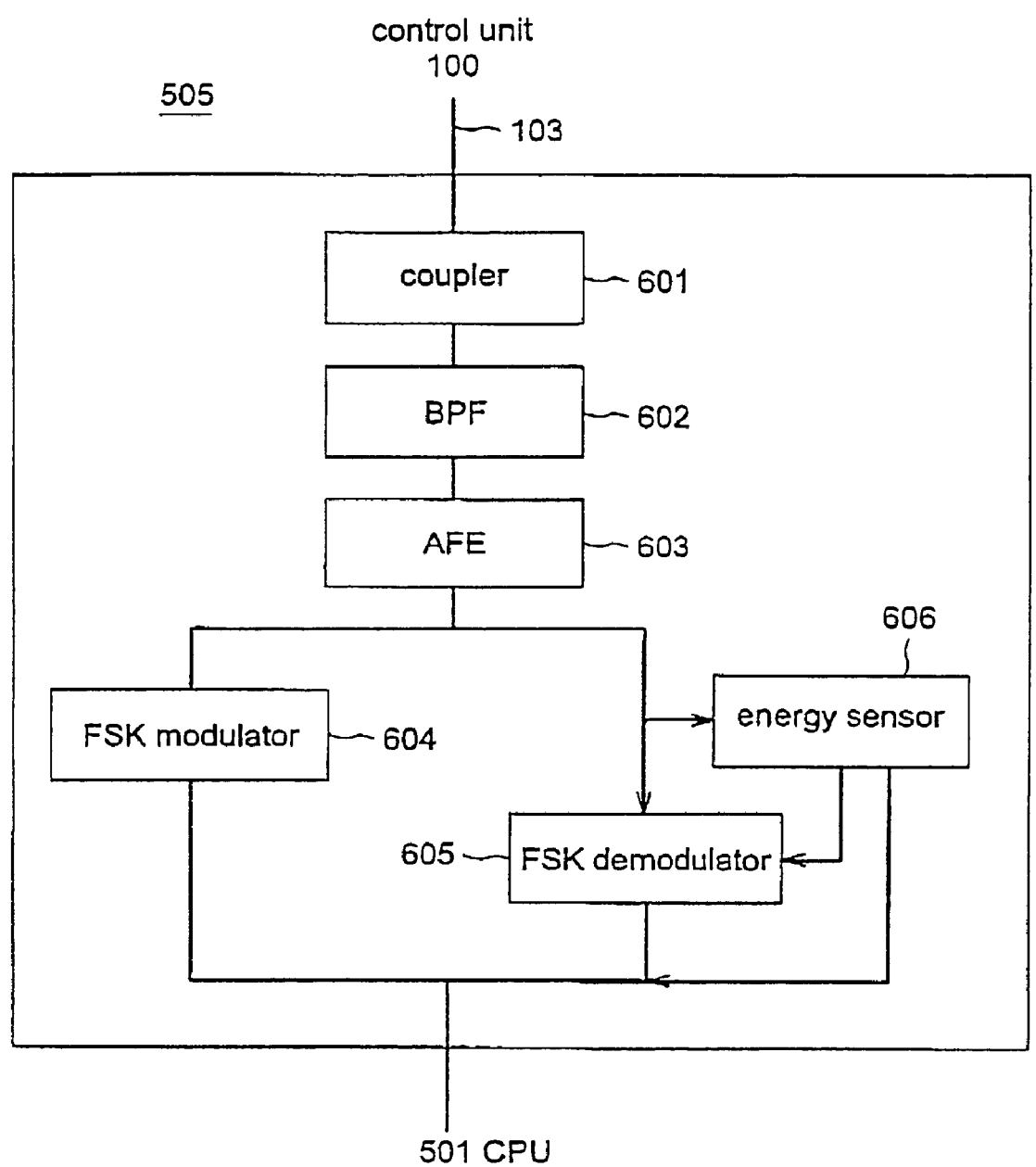
FIG. 6 illustrates, by a schematic drawing, the structure of a PLC unit installed to an appliance (television) which is connected to the control unit through a household power line, as described according to the embodiment of the invention.

FIG. 6 is a block diagram illustrating PLC unit 505 contained in television 107 which is connected to control unit 100 through power line 103. As shown by FIG. 6, television 107 is able to communicate through household power lines by the FSK modulation method (other modulation methods can be utilized in the same general manner).

Coupler 601, which is contained within PLC unit 505, extracts only the signals within the bandwidth utilized for power line communications. Band pass filter 602 allows only power line communication signals to pass by filtering out electrical noise and other signals generated by electric motors and other devices. Analog Front End (AFE) 603 performs an analog-digital switching operation to the signals extracted by the band pass filter.

FSK modulator 604 applies FSK modulation processing to the transmission signal sent to control unit 100, and FSK demodulator 605 applies FSK demodulation processing to the signal received from control unit 100. Energy sensor 606 detects a signal that has an energy value above a specific energy value for a predetermined frequency bandwidth, and notifies FSK demodulator 605 and CPU 501 of the presence of such signal. Upon receiving this notification, FSK demodulator 605 initiates demodulation processing. CPU

501 stops the transmission signal output to control unit 100 upon recognizing the presence of the received signal.

Control unit 100 references the data contained in appliance data table 300, which is stored in memory 202, when executing the power line communications function for appliances connected to control unit 100 through power line 103. Therefore, the appropriate data must be placed into appliance data table 300 before the power line communications can be conducted. To do this, control unit 100 randomly or periodically generates control signals as means of ascertaining the modulation method for each appliance connected to power line 103, and receives an acknowledgement signal, in response to one of the aforesaid generated control signals, indicating the modulation method, of each appliance which is then recorded in the memory 202. Moreover, even before the aforesaid control signal is generated, when control unit 100 receives a signal output from any appliance in the network, control unit 100 may analyze the signal, extract data from the signal indicating the modulation method for that appliance, and record the extracted data.

The following discussion will explain the random or periodic transmission of the aforesaid control signals used to ascertain the modulation method used by each appliance, and the response signal indicating the appliance modulation method to be recorded in the memory.

Figure 7:
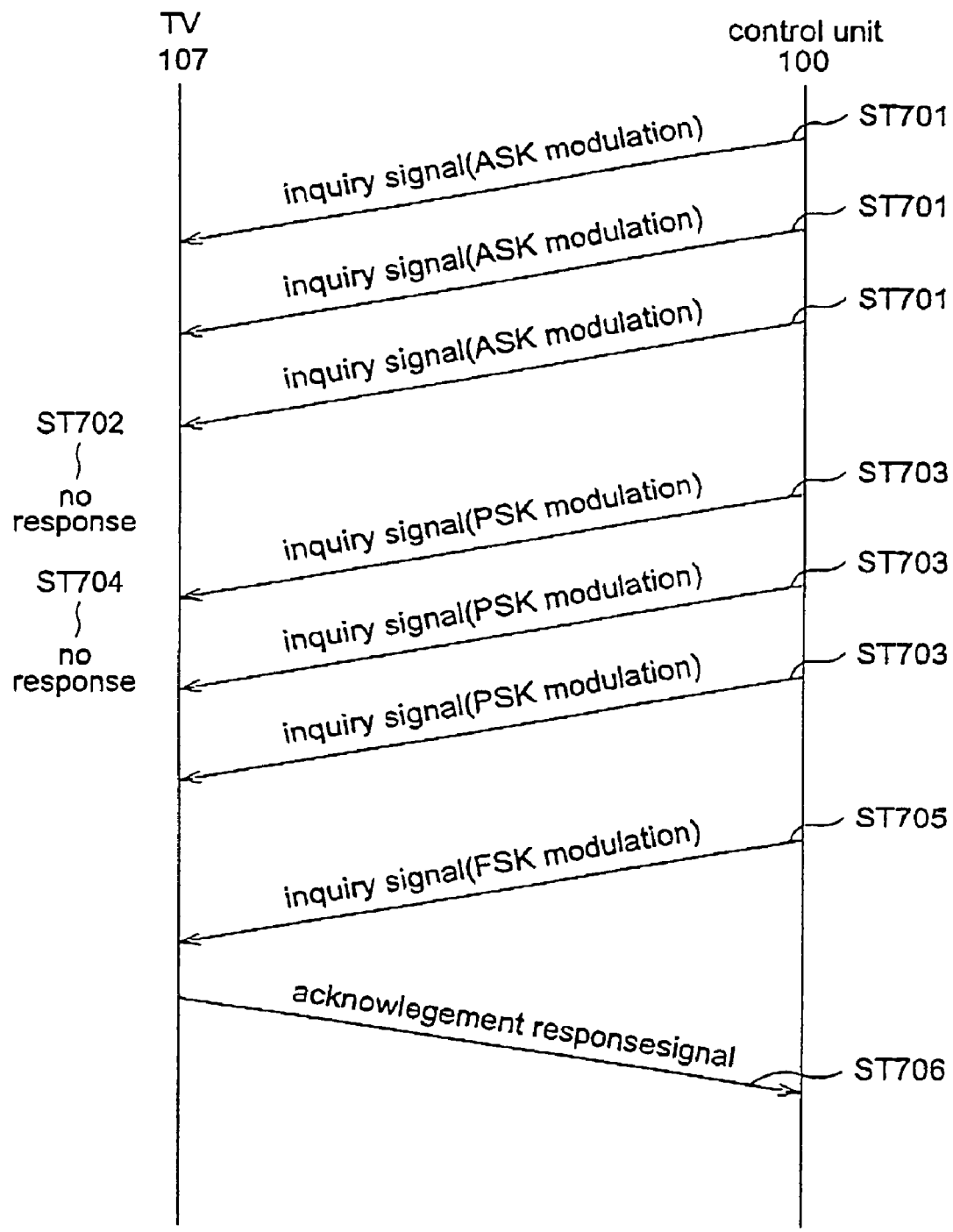
FIG. 7 illustrates signal sequence diagram showing, the inquiry signals output to each appliance so as to verify or determine the modulation method, as described according to the embodiment of the invention.

FIG. 7 is a chart illustrating the transmission sequence of control signals, output from control unit 100, which are utilized to ascertain the modulation method used by each appliance, and the acknowledgement response signal from the appliance. The chart of FIG. 7 shows the transmission sequence for one appliance connected to power line 103, that appliance being, for the purpose of this explanation, television 107 which is described in FIG. 5.

In this operation, control unit 100 outputs a sequence of various modulation method control signals, periodically or randomly, to the appliances connected to power line 103, as means of ascertaining the modulation method of the appliance to which said signals are transmitted. As the purpose of the control signals is to elicit an acknowledgment response from the appliance, they will be hereafter be referred to as "inquiry signals."

Figure 8:
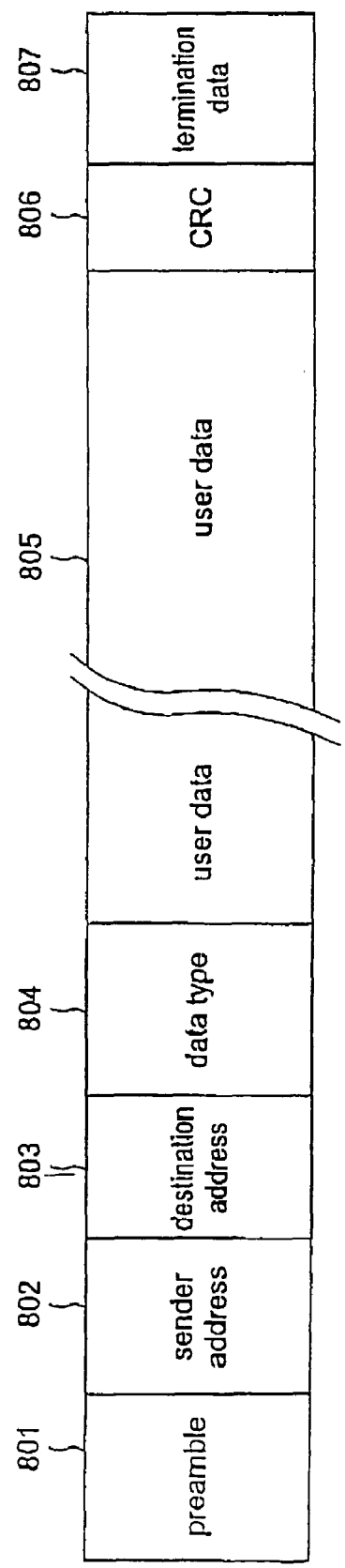
FIG. 8 illustrates a diagram showing, the data frames exchanged between the control unit and the appliances, as described according to the embodiment.

The following discussion will describe the data frame structure used in the data exchange operation between control unit 100 and the appliance. FIG. 8 is a diagram showing one example of data frames that can be used for data exchange between control unit 100 and each appliance.

The data frames in FIG. 8 are seen to include a preamble frame 801 that indicates the initiation of data transmission, a sender address frame 802, a destination address frame 803, a data type frame 804, a user data frame 805 that contains message data for the user, a cyclic redundancy check (CRC) frame 806 that checks for bit transmission errors during the transmission, and a termination data frame 807 that indicates the end of the transmission.

When an inquiry signal is output from control unit 100, sender address frame 802 contains the address of control unit 100, and destination address frame 803 contains the addresses of all appliances connected to power line 103, that is, the inquiry signal is broadcast to all addresses. Also, data type frame 804 indicates an inquiry signal, and user data frame 805 contains data indicating the modulation method specified by the inquiry signal.

At ST701 in FIG. 7, control unit 100 first outputs an inquiry signal, based on the ASK modulation method, to television 107. To prevent transmission errors, control unit 100 will output the inquiry signal up to a predetermined number of times, for example only, for three times, if a response signal is not received within a specific time period following each inquiry signal. Because television 107 uses an FSK modulation method for power line communications (see FIG. 6), it will not respond to the ASK inquiry signal (see ST702 in FIG. 7).

In the event that a response is not received to the ASK inquiry signal after e.g. three attempts, control unit 100 will output a PSK modulation method inquiry signal a maximum of e.g. three times (ST703) in the same manner as the previous ASK inquiry signal. Television 107, being only compatible with the FSK method, will not accordingly respond to the PSK inquiry signal (ST704).

In the event that there is no response to the PSK inquiry signal within a specified time duration, control unit 100 will output an FSK modulation method inquiry signal to television 107 (ST705). Because television 107 is only able to communicate through the FSK modulation method, it will only respond to the FSK inquiry signal by transmitting an acknowledgement signal back to the control unit 100 (ST706).

Upon receiving a response i.e. acknowledgment signal, control unit 100 is able to determine that the appliance (television 107) is compatible with the FSK modulation method, and is thus able to place data indicating that modulation method into appliance data table 300 in memory 201.

Control unit 100 is able to execute this type of modulation method recording operation for each appliance connected to power line 103. As a result, data pertaining to the modulation method for each appliance connected to power line 103 can be placed in appliance data table 300 in memory 202.

Figure 9:
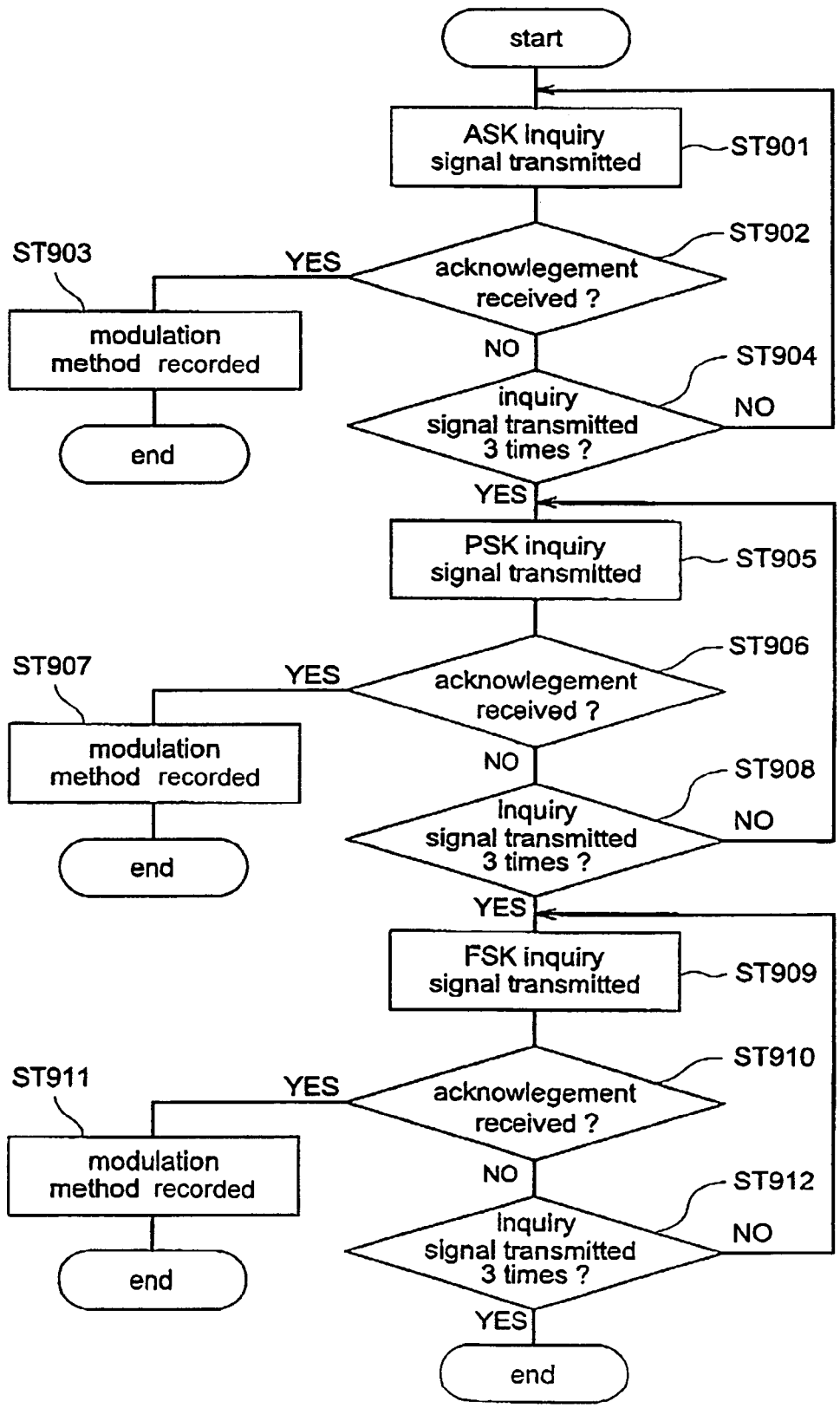
FIG. 9 illustrates a flowchart illustrating, as described by the embodiment, the operation of the control unit during the sequential signal output shown in FIG. 7.
Figure 10:
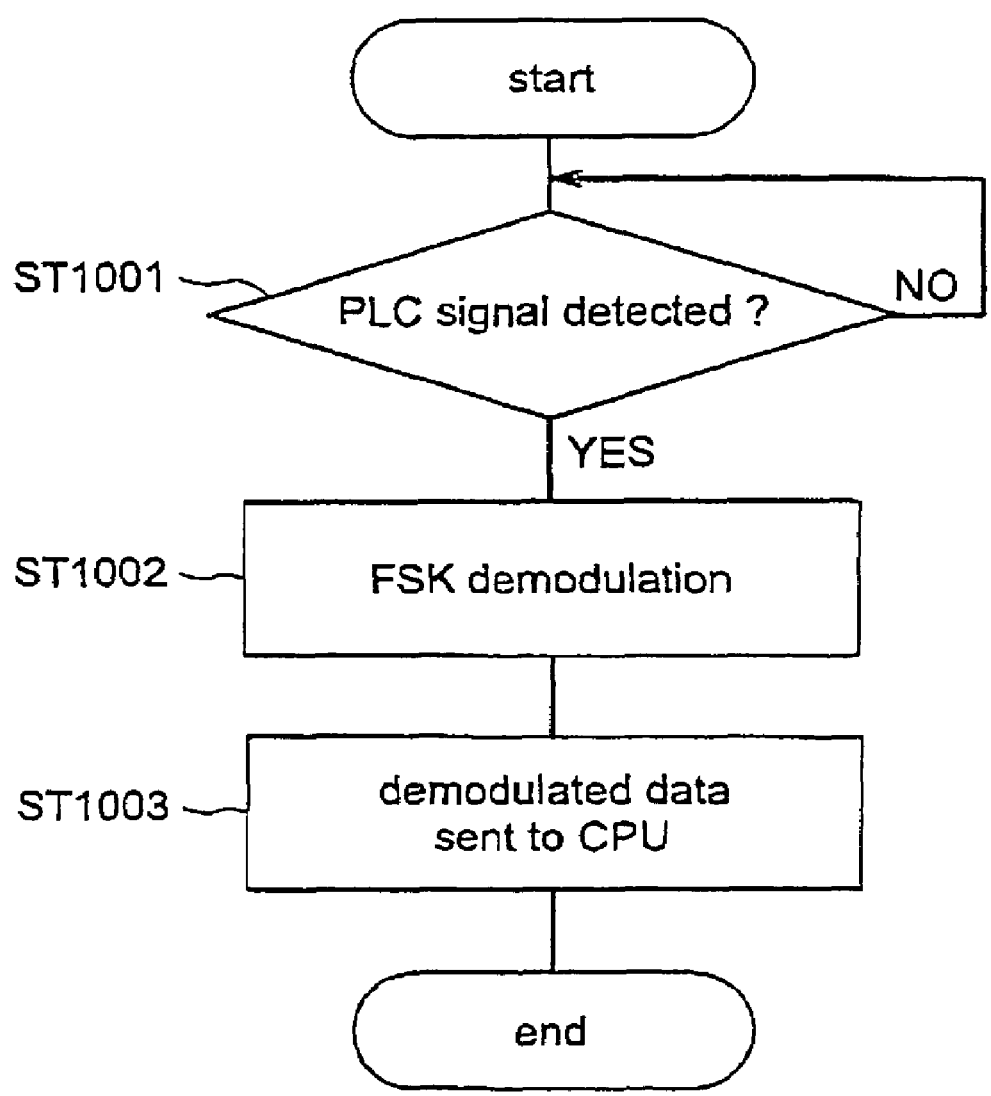
FIG. 10 illustrates a flow chart describing, the operation of the PLC unit in the appliance during the sequential signal output shown in FIG. 7, as described according to the embodiment of the invention.
Figure 11:
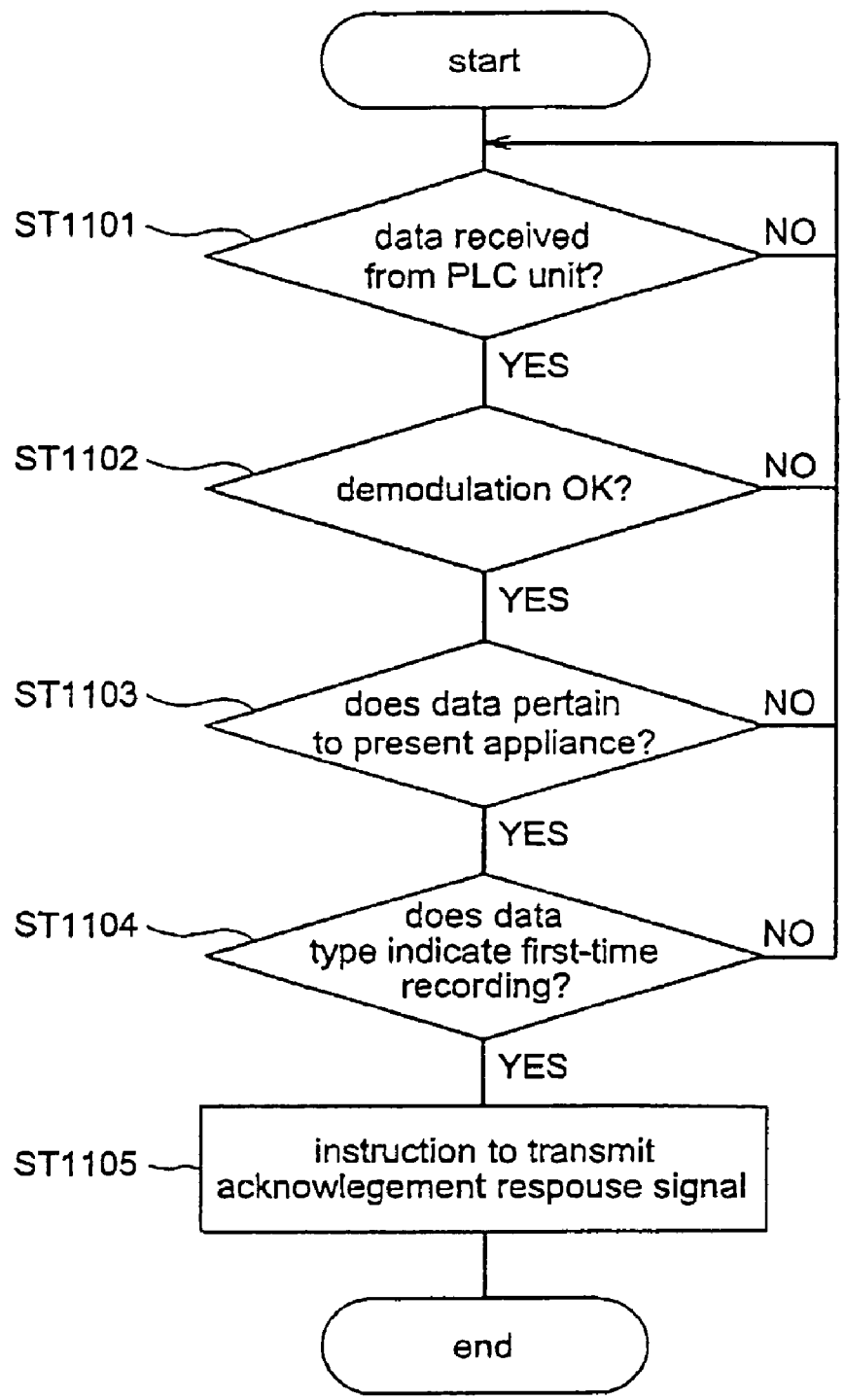
FIG. 11 illustrates a flow chart describing, the operation of CPU in the appliance during the sequential signal output shown in FIG. 7, as described according to the embodiment of the invention.

The following will explain the operation of control unit 100 and the appliance in regard to the signal transmission sequence shown in FIG. 7. FIG. 9 is a flowchart illustrating the operation of control unit 100 executing the signal transmission sequence shown in FIG. 7. FIGS. 10 and 11 are flowcharts explaining the operation of the appliance during the signal transmission sequence shown in FIG. 7. Moreover, FIG. 10 shows the operation of PLC unit 505 in television 107, and FIG. 11 shows the operation of CPU 501 in television 107.

As shown in FIG. 9, control unit 100 initially outputs i.e. transmits an ASK inquiry signal to the appliance (ST901) after which it is determined if a response has been received from the appliance within a specified time period (ST902). If a response signal is received, control unit 100 recognizes that the appliance is able to respond to the ASK inquiry signal, places data into appliance data table 300 in memory 202 indicating that the appliance is compatible with the ASK modulation method (ST903), and terminates the operation. At this point, control unit 100 has also recorded the data transmission speed based on the shift point in the reply signal carrier wave. According to the sequence shown in FIG. 7, however, as television 107 is only able to communicate through the FSK modulation method, television 107 will not respond to the ASK inquiry signal.

Conversely, if a response signal is not received at ST902, the signal will be transmitted a predetermined number of times and the control unit 100 will recognize a condition in which the inquiry signal has been output e.g. three times with no response (ST904). It is possible to avoid errors, which lack of a response may cause, by repeatedly outputting the inquiry signal for e.g. three times in the signal transmission sequence. When the control unit 100 has not yet output the inquiry signal for e.g. three times, this control sequence returns to ST901, and runs the same sequence again, as noted above.

If the ASK modulated inquiry signal has been output three times with no response, the PSK modulated inquiry signal will be output in the same manner as the ASK inquiry signal in steps ST901 through ST904. That is, the PSK inquiry signal is output to the appliance (ST905) after which a determination is made as to whether a response signal has been received within the allotted time (ST906). If a response signal is received, it indicates that the appliance is able to respond to the PSK inquiry signal, thus causing data indicating the compatibility of the appliance to be placed into appliance data table 300 in memory 202 (ST907), and the signal inquiry operation to terminate. Conversely, if a response signal is not received, it is determined that the PSK inquiry signal has been output three times without a response (ST908). According to the transmission sequence shown in FIG. 7, there would be no response to the PSK inquiry signal because television 107 is only compatible with the FSK modulation method.

If the PSK modulated inquiry signal has been output three times with no response, the FSK modulated inquiry signal will be output in the same manner as the PSK modulated inquiry signal was in steps ST905 through ST908. That is, the FSK inquiry signal is output to the appliance (ST909) after which a determination is made if a response signal has been received within the allotted time (ST910). If a response signal is received, it indicates that the appliance is able to respond to the FSK inquiry signal, thus resulting in data indicating the condition to be placed into appliance data table 300 in memory 202 (ST911), and the signal inquiry operation to terminate. If a response signal is not received, it is determined that a condition exists in which the FSK inquiry signal has been output three times without a response (ST912). According to the signal transmission sequence shown in FIG. 7, a response signal from television 107 will be received because television 107 uses the FSK modulation method. Therefore, data indicating that television 107 uses the FSK modulation method will be placed in appliance data table 300.

As shown in FIG. 10, when appliance-installed PLC unit 505 (in this case the PLC unit installed to television 107), is supplied with power, PLC unit 505 monitors for the detection of the frequency bandwidth signal (hereafter referred to as the PLC signal) which is used for power line communications and which includes the inquiry signal. When the PLC signal is detected (ST1001), PLC unit 505 will demodulate the PLC signal using the integrated FSK modulation method (ST1002), and send the demodulated data to CPU 501 (ST1003).

As shown in FIG. 11, CPU 501, which is installed in the appliance (in this case television 107), detects the data transmission from PLC unit 505. If the demodulated data from PLC unit 505 is received by CPU 501, (ST1101), that data is tested to ascertain if it has been demodulated in the correct format (ST1102). This test for correct demodulation format can be conducted to verify, for example, if a CRC (cyclic redundancy check) has been added to the post-demodulation data frame.

After the demodulation has been verified, it is ascertained if the address of the demodulated data corresponds to the address of the appliance (ST1103). Specifically, it is determined if the address of television 107 is contained in the demodulation data destination address frame.

If the address specified in the demodulated data corresponds to the appliance, it is then determined whether or not the data type in the modulation data frame should be treated as new data for first-time recording. (ST1104). To determining whether or not the data type denotes a first-time data recording, prevents an appliance that has sent a response signal to the control unit 100 before, from replying to the inquiry signal again.

If the data type is determined to be first-time recording data, CPU 501 instructs PLC unit 505 to send the response signal to control unit 100 (ST1105), and the processing operation is completed. A response signal is then sent by PLC unit 505 to control unit 100 as instructed by CPU 501.

If the answer is NO for any one of steps ST1101, 1102, 1103 or 1104, control is returned to await receipt of another data from PLC unit 505.

Through this operation, control unit 100 is able to verify and record the modulation method for the modem installed in each appliance even though the modulation method may be different for each PCL unit 505 which provides the modem function for each appliance connected to power line 103. Because this operation allows control unit 100 to operate according to the specific modulation method used by each appliance, it becomes possible to establish a power line communications system which does not require that all appliances be equipped with modems using the same modulation method.

Moreover, control unit 100 periodically outputs control signals to verify the modulation method used by the modem installed to each appliance connected to power line 103. As this operation verifies the modulation method for the modem installed to each appliance, the modulation method is automatically recorded, without the possibility of error, even for e.g. newly purchased appliances that have been recently connected to the system.

Although the embodiment describes a periodically output control signal employed as means of verifying the modem modulation method used by each appliance, the control signal may also be transmitted at random time intervals. In a case where a new appliance is installed, the modem modulation method for the new appliance may be initially recorded through a manual data recording operation at the time of installation. Thus the problem that it is impossible for the new appliance to communicate until the time at which the automatic modem modulation method verification is executed, is solved.

Figure 12:
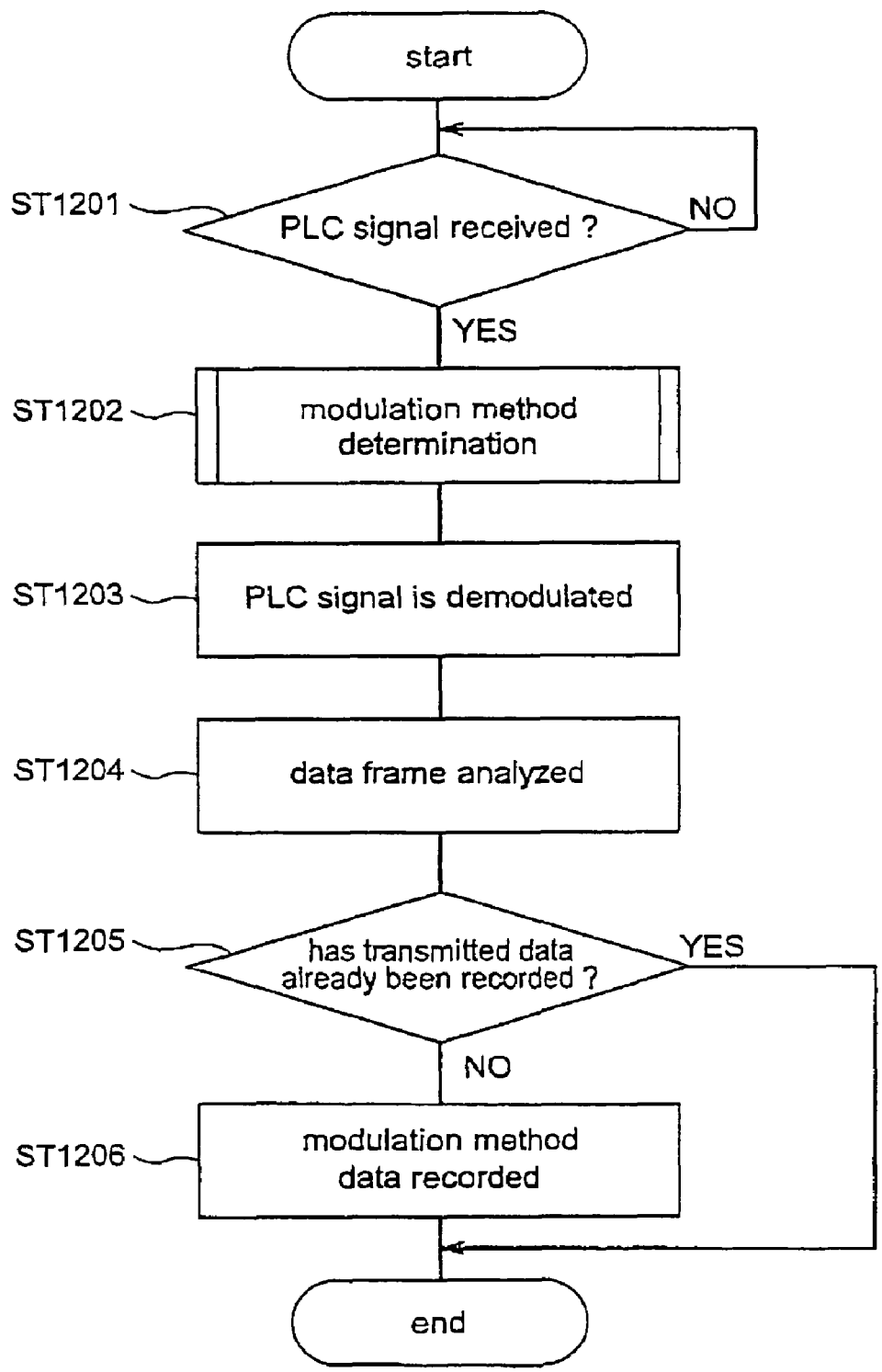
FIG. 12 illustrates a flowchart describing, the operation of the control unit when a signal is received from an appliance and when the control unit records appliance modulation method data, as described according to the embodiment of the invention.

The following will explain the operation wherein a signal is output from an appliance to control unit 100, and control unit 100 determines modulation method utilized by the appliance based on the signal. FIG. 12 is a flowchart showing the operation of control unit 100 when a modulation method signal is received from an appliance and the modulation method is determined based on the signal.

The operation shown in FIG. 12 describes a processing example in which an appliance has been newly connected to power line 103 and the modulation method used by the appliance is communicated to control unit 100. The appliance set a previously determined temporary address in the sender address 802, and sends, to control unit 100, a PLC signal which indicates that this message is intended for first-time recording of a modem method.

Figure 13:
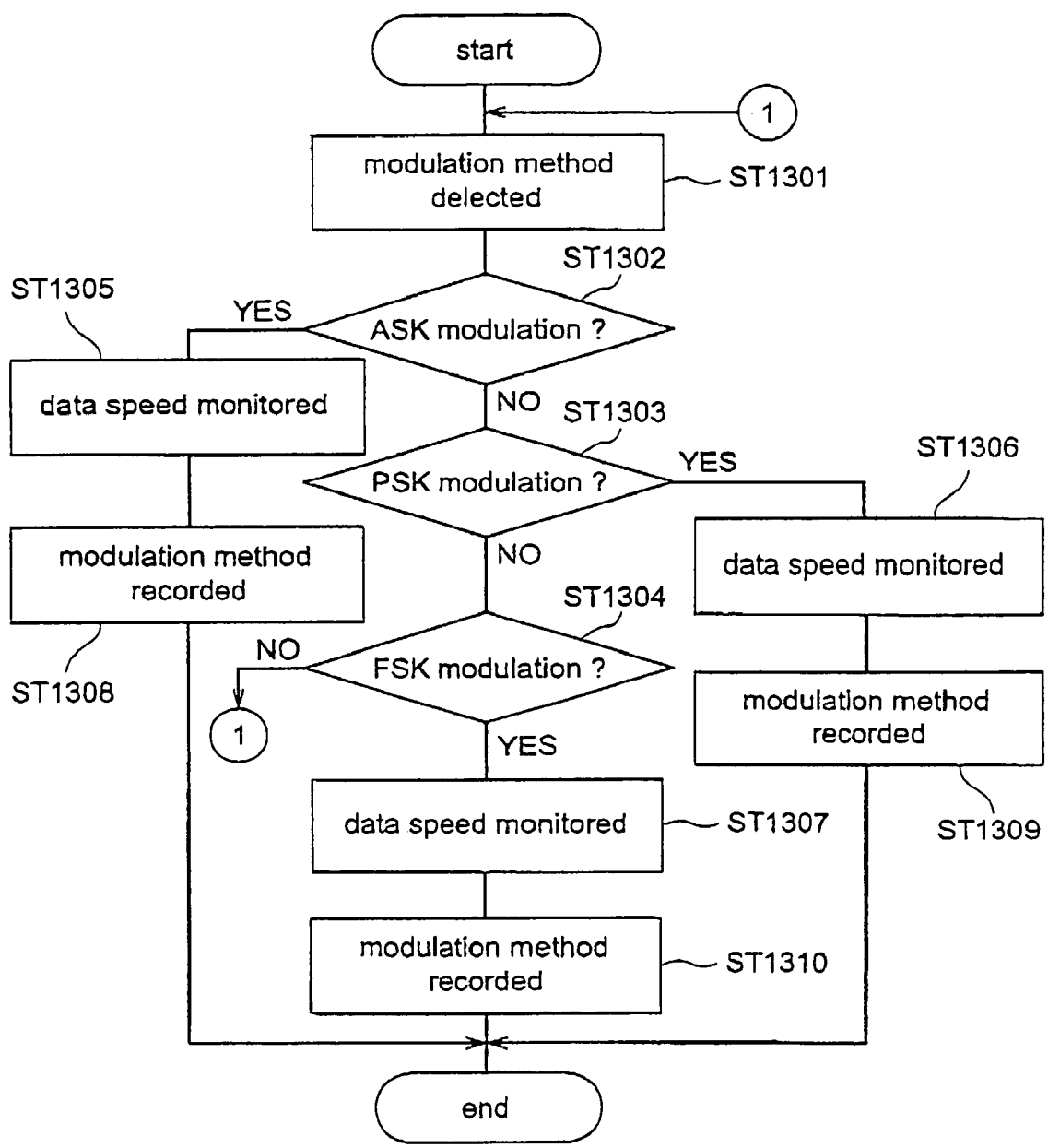
FIG. 13 illustrates a flowchart describing, the operation of the control unit when operating to determine modulation method at step 1202 of FIG. 12, as described according to the embodiment of the invention.

As shown in FIG. 12, control unit 100 is in standby status while waiting for a PLC signal from an appliance connected to power line 103. If a PLC signal is received from an appliance (ST1201), a process is applied to determine if the incoming signal is a PLC signal denoting a modulation method (ST1202). This modulation method determination process, which will be subsequently explained with reference to FIG. 13, is applied to detect the modulation method of the PLC signal received by control unit 100.

Once the modulation method of the PLC signal is confirmed, control unit 100 demodulates the PCL signal (ST1203) and analyzes the contents of the demodulated data frame (ST1204). On the result of this signal analysis, the temporary address is set in sender address 802, and data type 804 is recognized as a first-time recording.

After the data frames have been analyzed, a determination is made as to whether the transmitted modulation method data already exists in appliance data table 300 in memory 202 (ST1205). Furthermore, in a case where data type 804 (which was analyzed at ST1204) indicates data for first-time recording, it is thus determined that the modulation method data is not listed in appliance data table 300 in memory 202.

In a case where it is determined that the modulation method data has not been recorded, the modulation method data monitored at ST1202 is set into appliance table 300 (ST1206) and the operation is terminated. Conversely, if it is determined that the data already exists in table 300, the operation is terminated without any data recordation.

The following explains the process by which the modulation method determination is executed at ST1202. FIG. 13 is a flowchart that describes the process through which control unit 100 determines the modulation method. The modulation method determination is executed by determinator 413 which is installed within multi-PLC unit 204 in control unit 100.

As shown in FIG. 13, the modulation method determination begins when control unit 100 detects the modulation method of the PLC signal output from the appliance (ST1301). More specifically, control unit detects the shift point of the carrier wave which is the base of the PLC signal, and is thus able to detect the modulation method used by the appliance sending the PLC signal.

For example, if the modulation method used by the transmitting appliance is the PSK type, the carrier wave, which is the base of the PLC signal, is transmitted with changes in phase. If the modulation method is the FSK type, the carrier wave is transmitted with changes in frequency. If the modulation method is the ASK type, the carrier wave is transmitted with changes in amplitude. Control unit 100 is able to detect the phase shift points for PSK modulation, frequency shift points for FSK modulation, and amplitude shift points for ASK modulation, and is thus able to recognize the modulation method used by the transmitting appliance.

Figure 14:
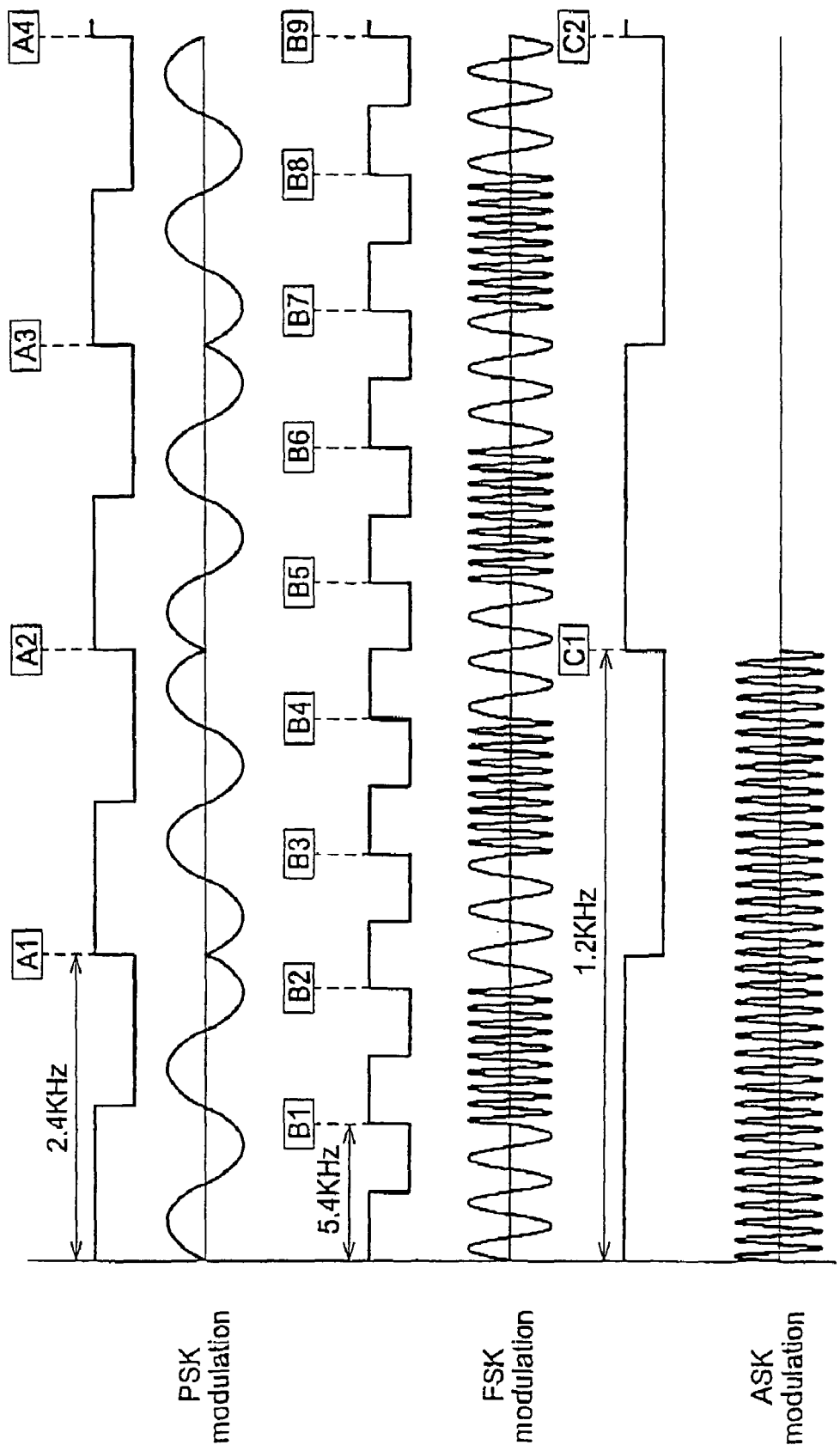
FIG. 14 illustrates a frequency graph describing, the difference of the shift points by different modulation methods, as described according to the embodiment of the invention.

FIG. 14 is a frequency graph illustrating the shift points for each type of modulation method monitored by control unit 100 when a modulation method is contained in the transmission signal from the appliance. Points A1, A2, A3, and A4 are the phase shift points monitored for a PSK modulation. B1, B2, B3, B4, B5, B6, B7, and B8 are the frequency shift points monitored for an FSK modulation. C1 and C2 are the amplitude shift points monitored for an ASK modulation.

After detecting the modulation method in the appliance transmission signal, control unit 100 determines whether the modulation method is an ASK type (ST1302), PSK type (ST1303), or FSK type (ST1304).

The data transmission speed, which is based on the time interval within which the shift point of the carrier wave appears, is monitored for each modulation method (ST1305~ST1307), and the monitored transmission speed and modulation method are recorded in appliance data table 300 of memory 202 (ST1308~ST1310). Furthermore, in regard to the FSK modulation method, which is the last modulation method to be determined in this process, in the event that there is no recognized FSK modulation method, an error condition is recognized and the processing sequence returns to ST1301.

Even when control unit 100 does not register the modulation method of the PLC unit that functions as a modem of the appliance, control unit 100 is able to ascertain and record the modulation method utilized in the modem of the appliance based on any signal output by the appliance. Thus, even when the modulation method utilized in the modem of each appliance connected to power line 103 is different, control unit 100 is still able to execute a control function for each appliance by applying the appropriate modulation method for the appliance and using household power lines as the communications medium. Thus, the present invention is able to eliminate the requirement that all appliances in a power line communications system be equipped with modems that use the same modulation method.

The following is a more specific explanation of how control unit 100 executes control of all appliances in a household power line communications system in which the appliances connected thereto are equipped with modems that use different modulation methods. The drawing in FIG. 15 illustrates the sequence through which control unit 100 controls power line communications between appliances that use different modulation methods.

Figure 15:
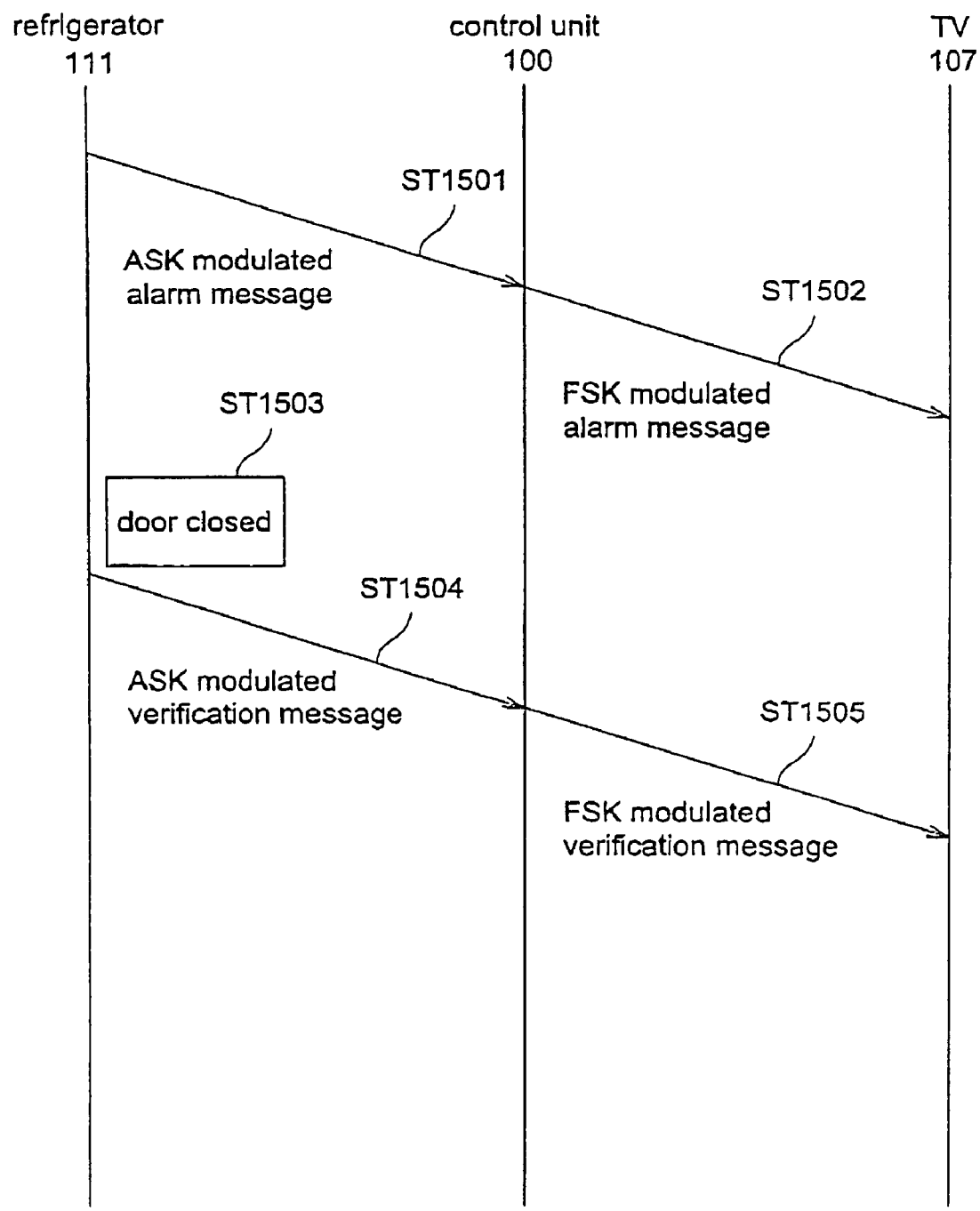
FIG. 15 illustrates a signal sequence diagram describing, how the control unit controls communication between two appliances that use different modulation methods, as described according to the embodiment of the invention.

FIG. 15 illustrates an example of how communications are controlled between refrigerator 111, which uses the ASK modulation method, and television 107, which uses the FSK modulation method. Specifically, this example shows the process through which an alarm message and verification message from refrigerator 11 are displayed on the screen of television 107. Furthermore, data pertaining to the modulation methods used by refrigerator 111 and television 107 are recorded in appliance data table 300 before messages are sent from refrigerator 111 and sent to television 107.

For example, an alarm message is output in the event that the refrigerator door has been left open longer than a specific time duration, and a verification message is output if the refrigerator door has been closed after being open for a specific time duration.

If the door of refrigerator 111 is monitored as being open for a specific time duration, an alarm message is sent from refrigerator 111 to control unit 100 (ST1501). When this occurs, the ASK modulation method used by refrigerator 111 is applied to the alarm message.

Control unit 100 analyzes the ASK-modulated alarm message, and then applies an FSK modulation processing operation to the signal due to the signal destination being television 107 which uses the FSK modulation method (ST1502). Television 107 analyzes the verification message and displays the message on screen 504.

The door of refrigerator 111 is then manually closed (ST1503) which results in refrigerator 111 outputting a verification message to control unit 100 (ST1504). The ASK modulation method used by refrigerator 111 is applied to the verification message.

Control unit 100 analyzes the ASK-modulated verification message, and then applies an FSK modulation processing operation to the signal due to the signal destination being television 107 which uses the FSK modulation method (ST1505). Television 107 analyzes the alarm message and displays the message on screen 504.

Figure 16:
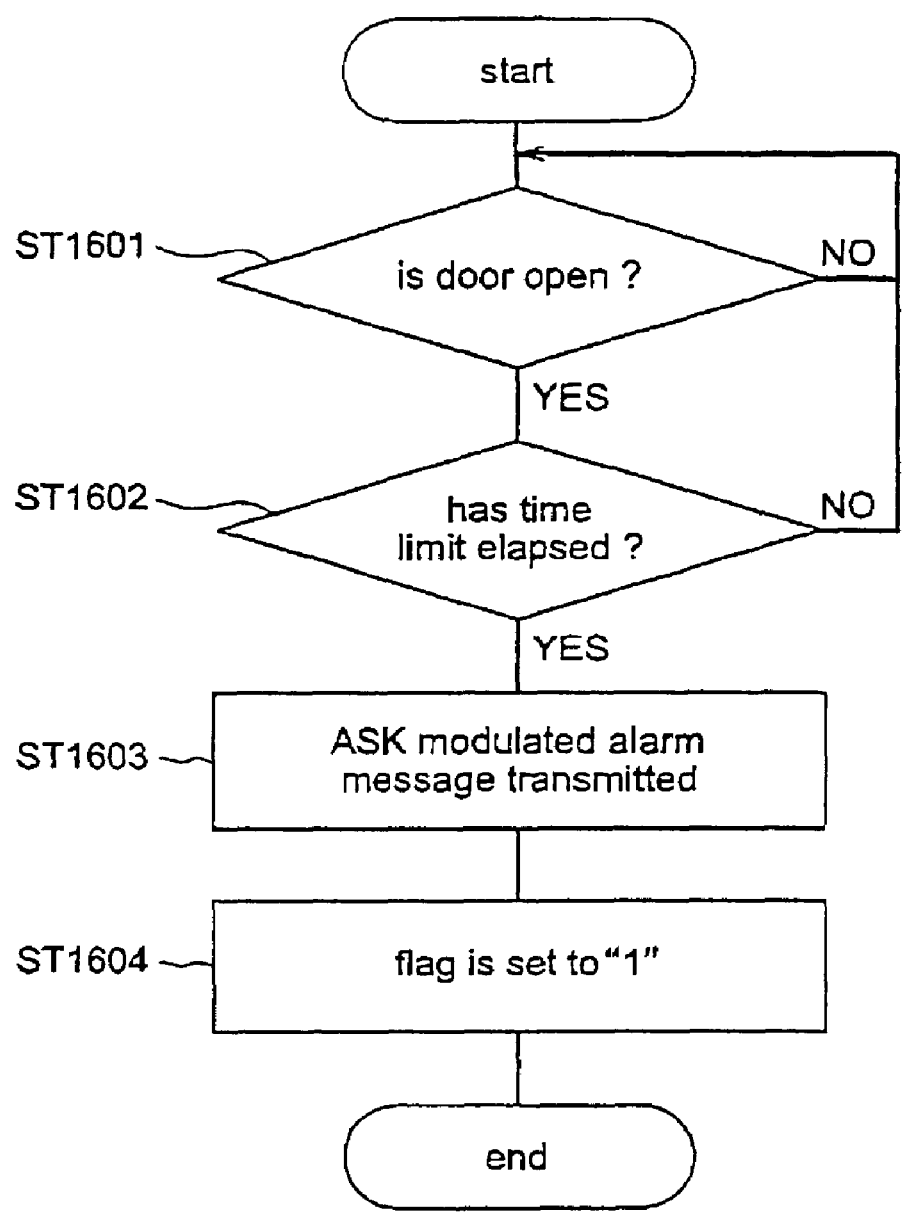
FIG. 16 illustrates a flow chart describing, the operation of the refrigerator during the signal sequence shown in FIG. 15, as described according to the embodiment of the invention.
Figure 17:
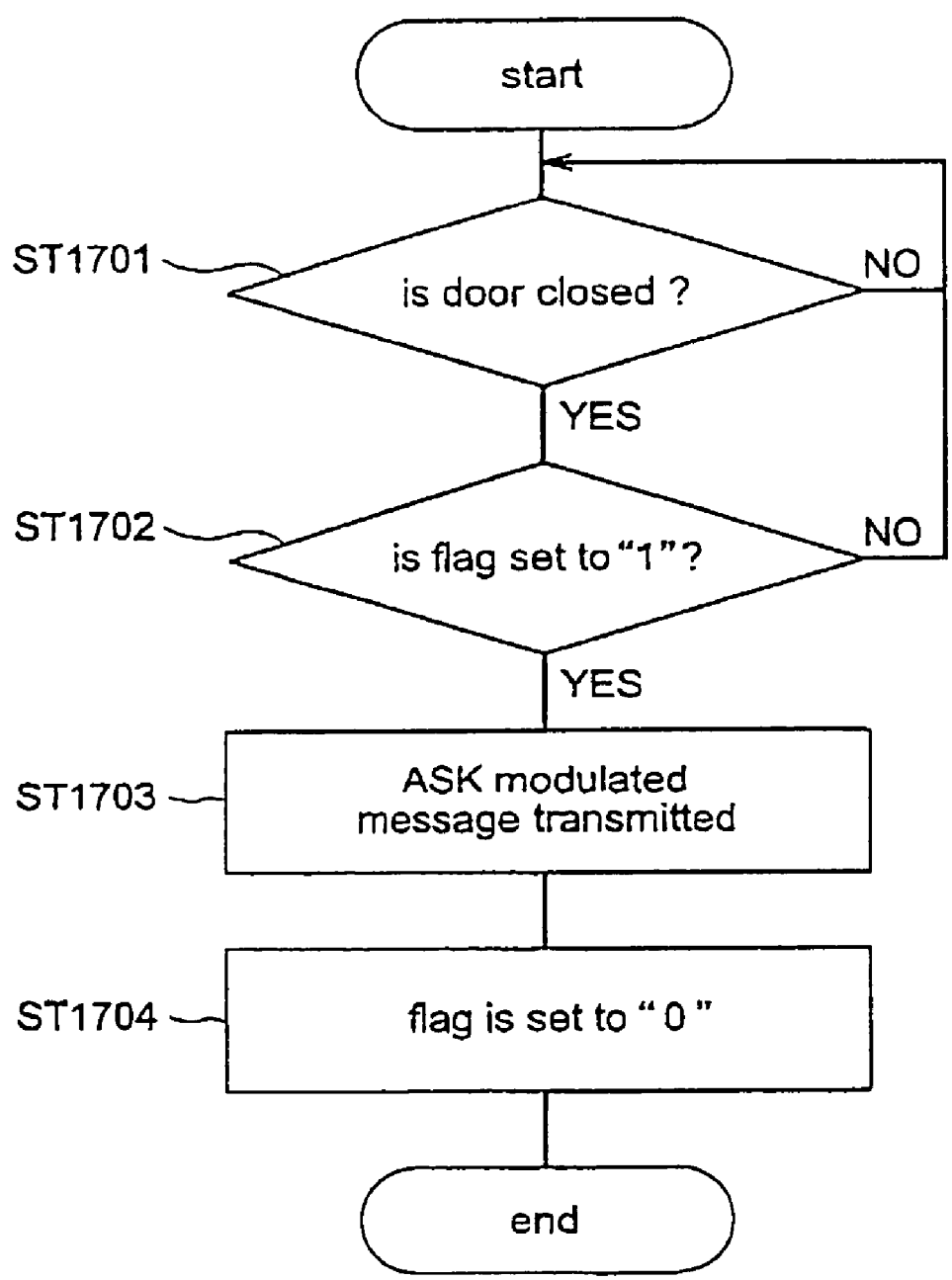
FIG. 17 illustrates a flow chart describing, the operation of the refrigerator during the signal sequence shown in FIG. 15, as described according to the embodiment of the invention.
Figure 18:
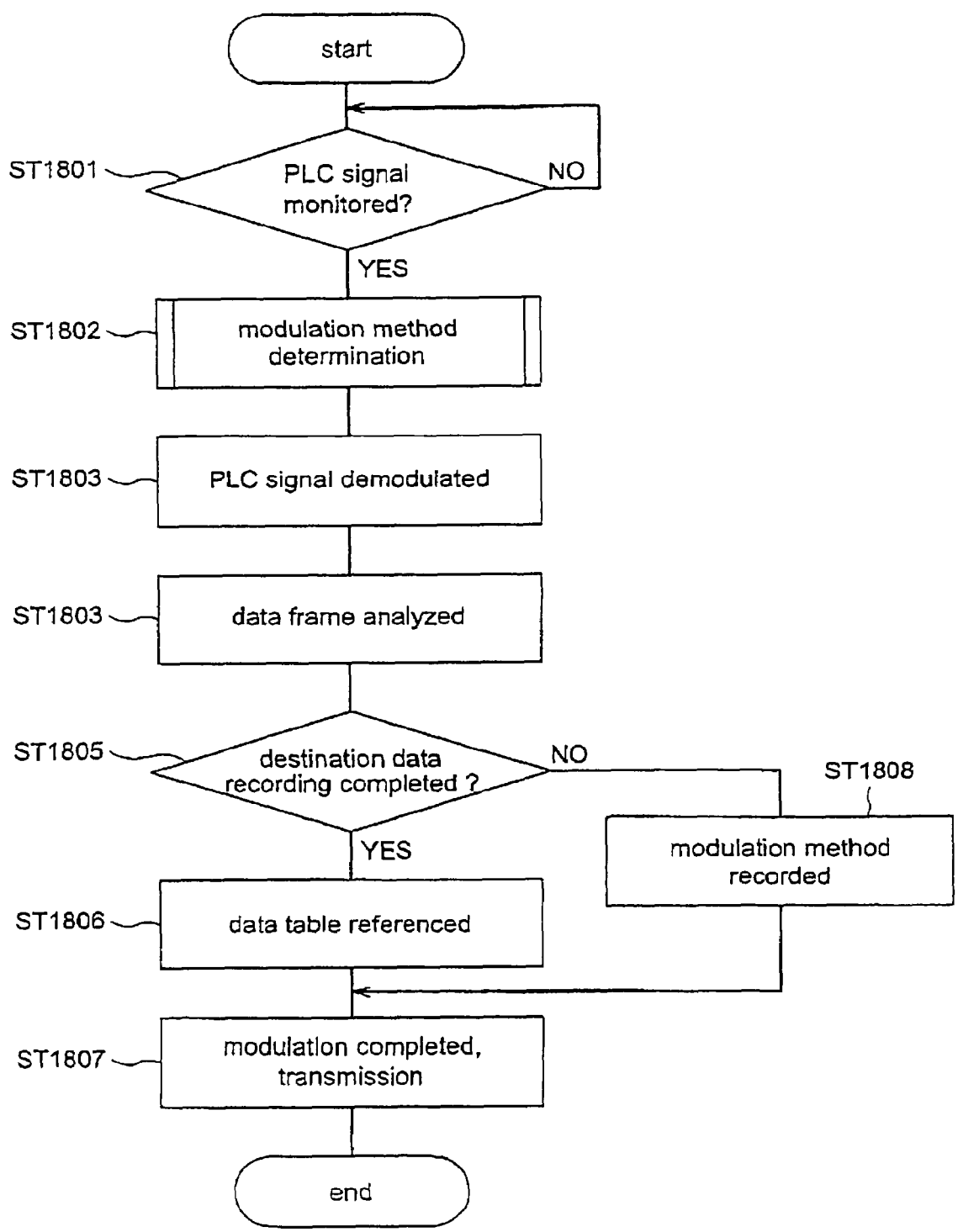
FIG. 18 illustrates a flow chart describing, the operation of the control unit during the signal sequence shown in FIG. 15, as described according to the embodiment of the invention.
Figure 19:
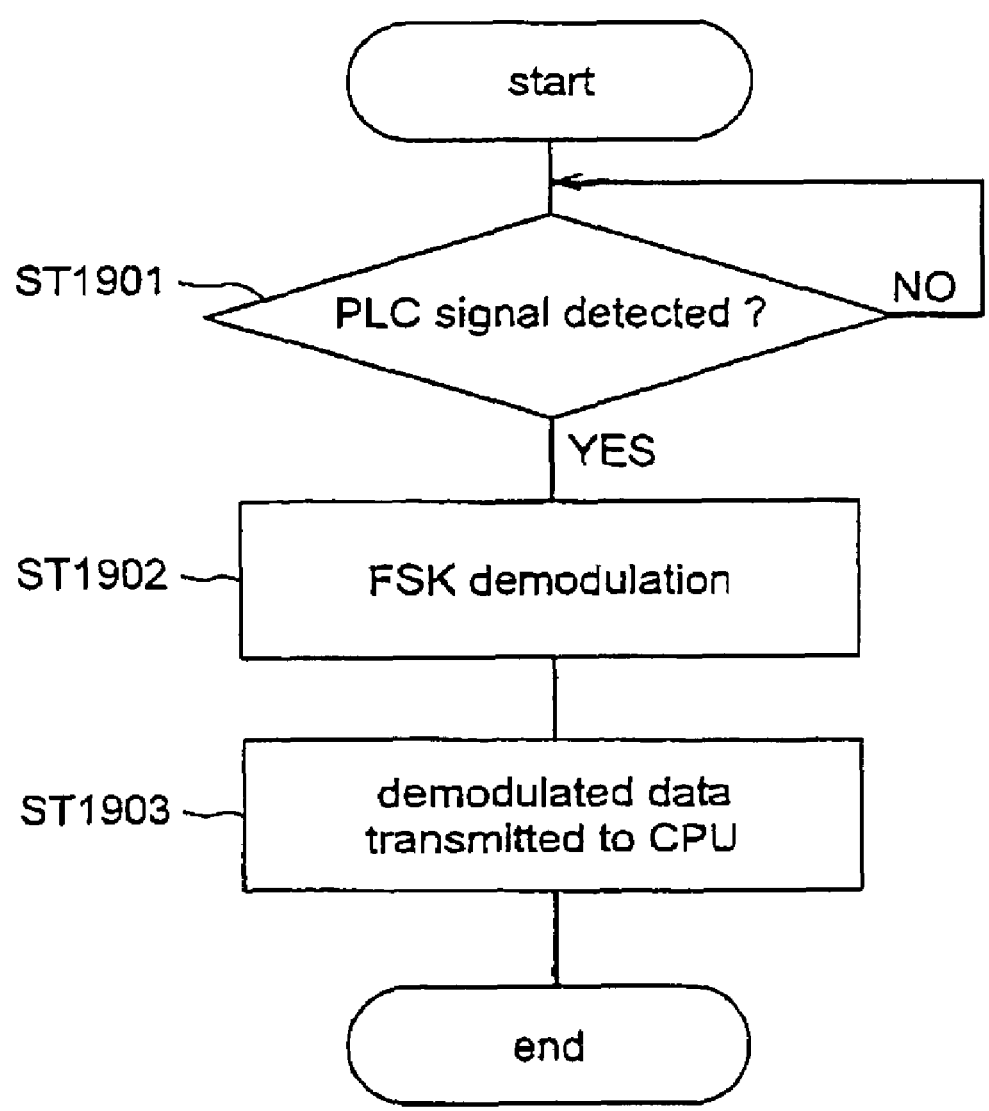
FIG. 19 illustrates a flow chart describing, the operation of the television during the signal sequence shown in FIG. 15, as described according to the embodiment of the invention.
Figure 20:
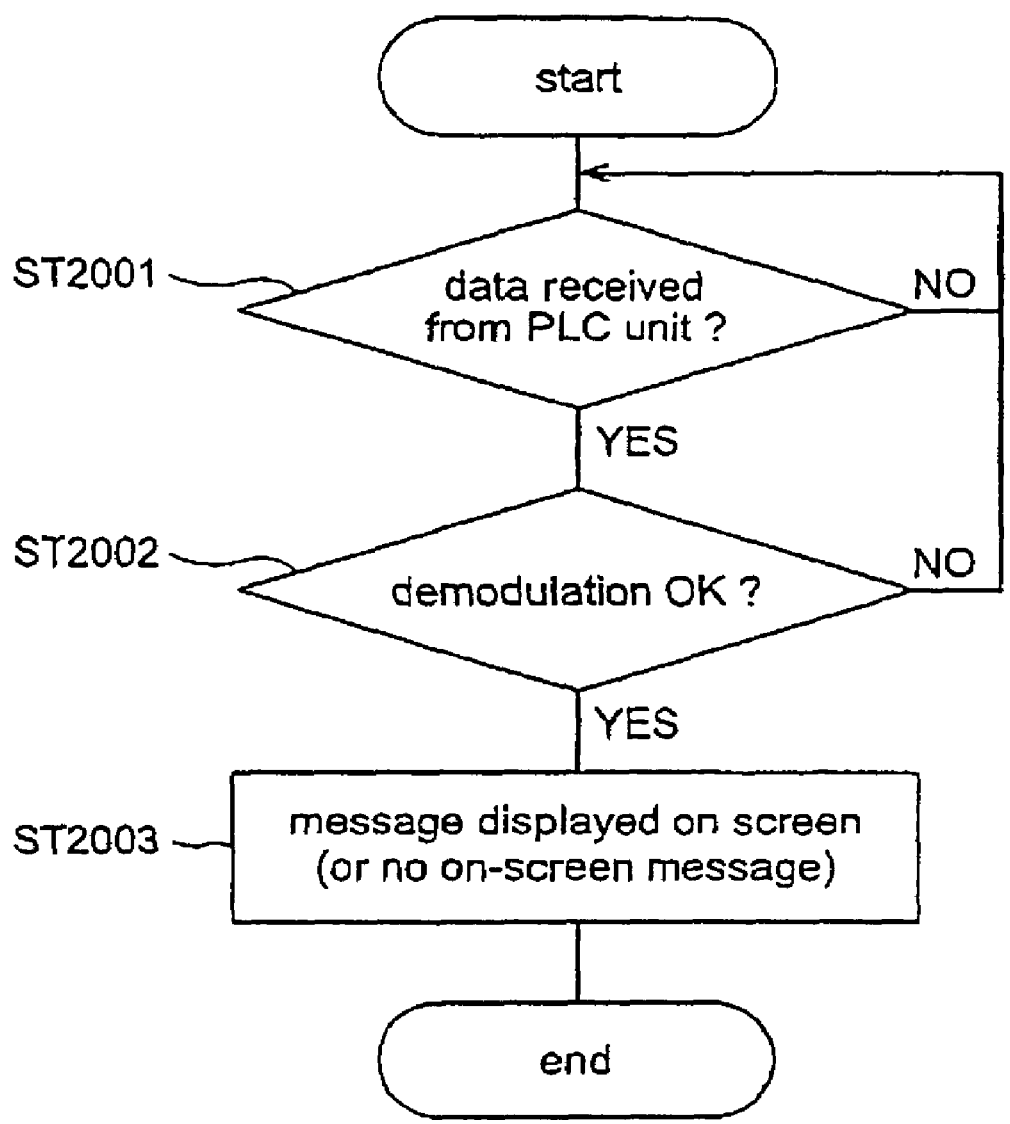
FIG. 20 illustrates a flow chart describing, the operation of the television during the signal sequence shown in FIG. 15, as described according to the embodiment of the invention.

The following will describe the operation of control unit 100 during the signal transmission sequence shown in FIG. 15. FIGS. 16 and 17 are flowcharts that explain the operation of refrigerator 11 during the signal sequence shown in FIG. 15. FIG. 18 explains the operation of control unit 100 during the signal sequence shown in FIG. 15. FIGS. 19 and 20 explain the operation of television 107 during the signal sequence shown in FIG. 15. FIG. 16 explains the operation of refrigerator 111 when the door has been monitored as being open for a specific time duration. FIG. 17 explains the operation of refrigerator 111 when the door has been monitored as being closed after being open for a specific time duration. FIG. 19 shows the operation of PLC unit 505 in television 107, and FIG. 20 shows the operation of CPU 501 in television 107.

As shown in FIG. 16, refrigerator 111 normally monitors for an open door condition. If a door open condition is monitored (ST1601), the door open time is also monitored to determine if the open time exceeds a specified time duration (ST1602).

If the door open time exceeds the specified time duration, in order to notify the system of the open door condition, the ASK modulator in the PLC unit of refrigerator 111 applies ASK modulation to the alarm message output to control unit 100 (ST1603). A "1" is then set (ST1604) for the open flag, after which the operation is terminated.

As shown in FIG. 17, refrigerator 111 normally monitors for a door closed condition in the same manner as for a door open condition. When a door closed condition is monitored (ST1701), a determination is made as to whether a "1" has been set for the open flag (ST1702).

If a "1" has been set for the open flag, the ASK modulator in the PLC unit of refrigerator 111 applies an ASK modulation to the verification message output to control unit 100 (ST1703). A "0" is then set (ST1704) for the open flag, after which the operation terminates.

As shown in FIG. 18, control unit 100, which is in a standby condition, monitors for PLC signal output from an appliance. If a PLC signal from an appliance connected to power line 103 is received (ST1801), a modulation method determination is conducted to ascertain the modulation method of the PLC signal (ST1802). The modulation method determination executed here will not be explained as it is essentially the same as the previously explained procedure relating to FIG. 13. This modulation method determination may be omitted if data indicating the modem modulation method is already registered.

If the modulation method of the PLC signal is monitored, control unit 100 demodulates the PLC signal (ST1803), and the contents of the demodulated data frame is analyzed (ST1804). As a result of this signal analysis, the address allocated for refrigerator 111 (0X00111 in FIG. 3) is written into transmission origin (e.g. sender address) data frame 802, the address allocated for television 107 (0X0107) is written in to destination address data frame 803, and the data in data type designation frame 804 is ascertained to be an alarm message.

After the data frames have been analyzed, control unit 100 determines, based on the address indicated by the analyzed data for the destination address in frame 803, whether or not data indicating the alarm message sender has been registered in appliance data table 300 (ST1805). As mentioned previously, data pertaining to the modulation method used by television 107 has been placed into appliance data table 300.

If the address of the sending appliance has been recorded in appliance data table 300, control unit 100 references the modulation method data held in appliance data table 300 (ST1806). As shown in FIG. 3, as there is data in appliance data table 300 indicating that television 107 uses the FSK modulation method, the fact that television 107 uses the FSK modulation method can be readily referenced by control unit 100.

By referencing the modulation method data held in appliance data table 300, control unit 100 is able to modulate the alarm message output by refrigerator 111 accordingly, and send that modulated alarm message to television 107 (ST1807). In other words, the alarm message is sent to television 107 after the FSK modulation process has been applied in order that the modulation method of the message signal corresponds to that of the destination, which is television 107.

Moreover, in the event that data indicating the modulation method is not stored in appliance data table 300 (ST1805), control unit 100, as shown in FIG. 9, will enter the modulation method data into appliance data table 300 for the appliance connected to power line 103 (ST1808). Therefore, control unit 100 is able to recognize the modulation method used by the destination appliance (which in this case is television 107), modulate the alarm signal output from refrigerator 111 based on the aforesaid modulation method, and send that modulated alarm message to television 107.

Although the preceding discussion described the signal processing operation only for an alarm message output from refrigerator 111, the signal processing operation for the verification message is conducted in essentially the same manner. In other words, the verification signal from refrigerator 111 is demodulated according to the modulation method used by refrigerator 111, after which the signal is modulated according to the modulation method used by television 107, and then output to television 107.

As shown in FIG. 19, PLC unit 505 of television 107 will monitor for a PLC signal when electrical power is turned on. If a PLC signal is detected (ST1901), PLC unit 505 will demodulate the PLC signal according to the resident FSK modulation method, and send the demodulated data to CPU 501 (ST1903).

As shown in FIG. 20, CPU 501 in television 107 monitors the data transmission from PLC unit 505. In the event that demodulated data is received from PLC unit 505 (ST2001), a determination is made as to whether that data has been appropriately demodulated (ST2002). This can be done, for example, by verifying that a CRC has been applied to the modulated data frame.

If the data has been appropriately demodulated, television 107 displays the data on-screen (ST2003). This operation allows the alarm message sent by refrigerator 111 to be displayed on screen 504 of television 107. Furthermore, while this explanation has covered the operation through which an alarm message can be displayed on screen 504 of television 107, the operation through which a verification message is received in order to remove the alarm message from screen 504 is also conducted through the operation shown in the FIG. 20 flowchart.

The operation of control unit 100 is able to provide a communications function between a first appliance (refrigerator 111) and a second appliance (television 107), based on data, held in appliance data table 300, that relates to the modulation method used by each appliance. To provide this communication function, control unit 100 changes the control signal from one corresponding to the modulation method used by the modem of the first appliance (refrigerator 111) to one that corresponds to the modulation method used by the modem of the second appliance (television 107), and thus makes possible power line communications between appliances even in cases where the appliances connected to power line 103 are equipped with PLC modems that operate according to different modulation methods. In the aforesaid example of an operating embodiment, television 107 is able to display a message indicating that the door of refrigerator 111 has been left open more than a specified time period, thus demonstrating that power line communications between household appliances can be conducted without the requirement that the appliances be equipped with modems using the same modulation method.

While the embodiment describes control unit 100 as a component existing separately and independently of the appliances, control unit 100 may also be installed internally to each appliance. If internally installed, it is obvious that control unit 100 would provide the same function, operation, and results as already described in the embodiment. Furthermore, both control unit 100 and another apparatus that performs the same control functions as control unit 100 may be provided in the system. For example, the other apparatus that executes the same control functions as control unit 100 is set as a sub-control in the system. Accordingly, when the control unit 100 can not function adequately due to a change in communication status, the other apparatus can support the control unit 100 so as to continue communications with the other appliances.

As the previous discussion has made clear, the present invention is able to control communication between all appliances connected to a household power line, even in Europe where no modem standard has been established for household power line communications. Furthermore, the present invention does not require that appliances in a power line communications network be equipped with modems that use the same modulation method.

The present invention is not limited to the above described embodiment, and various variation and modifications may be possible without departing from the scope of the present invention.

The application is based on the Japanese Patent Application No. 2002-367803 filed on Dec. 19, 2002, entire content of which is expressly incorporated by reference here.

What is claimed is:

1. A control apparatus for managing communications between a plurality of electric appliances connected to a household power line network, comprising;
    a power line communicator that is capable of transmitting a plurality of different types of modulation method control signals to each of a plurality of electric appliances via the household power line network, each type of control signals utilizing a different modulation method;
    a controller that receives, from each electric appliance connected to the household power line network, a response via the household power line network to one of the plurality of different types of modulation method control signals said controller detecting which type of modulation method control signal based on said received response to judge the type of modulation method that is utilized in each electric appliance.

2. The control apparatus according to claim 1, wherein the plurality of types of modulation method control signals include at least two of a Phase Shift Keying (PSK) modulation method, a Frequency Shift Keying (FSK) modulation method, and an Amplitude Shift Keying (ASK) modulation method.

3. A control apparatus for managing communications between a plurality of electric appliances connected to a household power line network, comprising;
    a power line communicator that receives modulation method control signals from multiple electric appliances;
    a controller that detects shift points of the carrier wave of said modulation method control signals, that judges, based on an interval of said shift points, which type of modulation method is utilized in each electric appliance and that stores the type of modulation method utilized in each electric appliance.

4. The control apparatus according to claim 3, wherein said controller detects one of a phase shift point, a frequency shift point, and an amplitude shift point to decide said interval of shift points, and judges, based on a result of said detection, which type of modulation method is utilized in each said electric appliance.

5. The control apparatus according to claim 3, wherein said controller detects one of a phase shift point, a frequency shift point, and an amplitude shift point to decide said interval of shift points, and judges, based on a result of said detection, that said electric appliance utilizes a Phase Shift Keying (PSK) modulation method when a phase shift point is detected, that said electric appliance utilizes a Frequency Shift Keying (FSK) modulation method when a frequency shift point is detected, and that said electric appliance utilizes an Amplitude Shift Keying (ASK) modulation method when an amplitude shift point is detected.

6. A control apparatus for managing communications between a plurality of electric appliances connected to a household power line network, comprising;
    a memory that stores information regarding which type of modulation method is utilized in each electric appliance;
    a power line communicator that receives a modulation method control signal from a first electric appliance and transmits a modulation method control signal to a second electric appliance:
    a controller that compares the type of modulation method of the first electric appliance with the type of modulation method of the second electric appliance, and converts the type of the modulation method control signal of the first electric appliance into the type of the modulation method control signal of the second electric appliance when the type of modulation method utilized in the first electric appliance is different from that of the second electric appliance.

7. The control apparatus according to claim 6, wherein said controller detects one of a phase shift point, a frequency shift point, and an amplitude shift point to decide said interval of shift points, and judges which type of modulation method is utilized in said each electric appliance.

8. The control apparatus according to claim 6, wherein said controller detects one of a phase shift point, a frequency shift point, and an amplitude shift point to decide said interval of shift points, and judges, based on a result of said detection, that said electric appliance utilizes a Phase Shift Keying (PSK) modulation method when a phase shift point is detected, that said electric appliance utilizes a Frequency Shift Keying (FSK) modulation method when a frequency shift point is detected, and that said electric appliance utilizes an Amplitude Shift Keying (ASK) modulation method when an amplitude shift point is detected.

9. A control method for managing communications between a plurality of electric appliances connected to a household power line network, comprising:
    transmitting a plurality of different types of modulation method control signals to each of plurality of electric appliances via the household power line network, each type of modulation method control signal utilizing a different modulation method;
    receiving, from each electric appliance connected to the household power line network, a response via the household power line network to one of the plurality of different types of modulation method control signals;

detecting which type of modulation method control signal based upon the received response;

judging the type of the modulation method that is utilized in each electric appliance based on the detection.

10. The control apparatus according to claim 9, wherein the plurality of types of modulation method signals include at least two of a Phase Shift Keying (PSK) modulation method, a Frequency Shift Keying (FSK) modulation method, and an Amplitude Shift Keying (ASK) modulation method.

11. A control method for managing communications between a plurality of electric appliances connected to a household power line network, comprising:

receiving modulation method control signals from a plurality of electric appliances;

detecting the shift points of the carrier wave of the modulation method control signals;

judging, based on the interval of said shift points, which type of modulation method is utilized in each electric appliance;

storing the type of modulation method utilized in each electric appliance.

12. The control method according to claim 11, wherein, the judging which type of modulation method is utilized in said each electric appliance, comprises detecting one of a phase shift point, a frequency shift point, and an amplitude shift point based on an interval of the shift points.

13. The control method according to claim 11, wherein by detecting one of a phase shift point, a frequency shift point and an amplitude shift point based on said interval of shift points, it is judged that said electric appliance utilizes a Phase Shift Keying (PSK) modulation method when a phase shift point detected, that said electric appliance utilizes a Frequency Shift Keying (FSK) modulation method when a frequency shift point is detected, and that said electric appliance utilizes an Amplitude Shift Keying (ASK) modulation method when an amplitude shift point is detected.

14. A control method for managing communications between a plurality of electric appliances connected to a household power line network, including a memory that stores information regarding which type of modulation method is utilized in each electric appliance, comprising:

receiving a modulation method control signal from a first electric appliance, said modulation method control signal to be sent to a second electric appliance;

comparing the type of modulation method of the first electric appliance with the type of modulation method of the second electric appliance;

converting the type of the modulation method control signal of the first electric appliance into the type of the modulation method control signal of the second electric appliance when, based on a result of the comparing, the type of modulation method utilized in the first electric appliance is different from that of the second electric appliance;

transmitting said converted modulation method control signal to the second electric appliance.

15. The control method according to claim 14, further comprising detecting one of a phase shift point, a frequency shift point, and an amplitude shift point based on an interval of the shift points, and judging which type of modulation method is utilized in said each electric appliance.

16. The control method according to claim 14, further comprising detecting one of a phase shift point, a frequency shift point and an amplitude shift point based on an interval of the shift points, and judging that said electric appliance utilizes a Phase Shift Keying (PSK) modulation method when a phase shift point is detected, that said electric appliance utilizes a Frequency Shift Keying (FSK) modulation method when a frequency shift point is detected, and that said electric appliance utilizes an Amplitude Shift Keying (ASK) modulation method when an amplitude shift point is detected.

* * * * *